United States Patent
Meier et al.

(10) Patent No.: US 6,574,906 B1
(45) Date of Patent: *Jun. 10, 2003

(54) FISHING DEVICE CONTAINER

(75) Inventors: Walter Louis Meier, Cumming, GA (US); Thomas V. Chorey, Jr., Atlanta, GA (US)

(73) Assignee: Inventive Designs, Ltd., Cumming, GA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/340,911

(22) Filed: Jun. 28, 1999

Related U.S. Application Data

(60) Provisional application No. 60/091,153, filed on Jun. 30, 1998.

(51) Int. Cl.[7] .............................................. A01K 97/06
(52) U.S. Cl. ...................................................... 43/25.2
(58) Field of Search ............... 43/25.2, 26; 206/315.11; D22/126, 134; 224/920

(56) References Cited

U.S. PATENT DOCUMENTS

| | | | |
|---|---|---|---|
| 1,216,069 A | * | 2/1917 | Cammack .................... 43/25.2 |
| 3,190,027 A | | 6/1965 | Spangler |
| 3,199,243 A | * | 8/1965 | Caston .......................... 43/26 |
| 4,203,245 A | | 5/1980 | Peterson |
| 4,418,490 A | | 12/1983 | Ancona |
| 4,467,551 A | | 8/1984 | Pulver |
| 4,831,772 A | | 5/1989 | Gillespie |
| 4,884,357 A | | 12/1989 | Clifford |
| 4,920,683 A | | 5/1990 | Weber |
| 4,944,111 A | | 7/1990 | Daniel |
| 5,020,264 A | | 6/1991 | Demski |
| 5,020,269 A | | 6/1991 | Gentry et al. |
| 5,079,863 A | | 1/1992 | Gillespie |
| 5,123,197 A | | 6/1992 | Gentry et al. |
| 5,131,180 A | | 7/1992 | Ives |
| 5,214,874 A | | 6/1993 | Faulkner |
| 5,277,306 A | | 1/1994 | Sargent |
| 5,417,354 A | * | 5/1995 | Jones ......................... 224/613 |
| 5,505,014 A | * | 4/1996 | Paullin ....................... 43/25.2 |
| 5,588,245 A | * | 12/1996 | Vance ......................... 43/25.2 |
| 5,870,849 A | | 2/1999 | Colson, Jr. |
| 5,957,284 A | * | 9/1999 | Caddell et al. .......... 206/315.11 |
| 5,992,082 A | * | 11/1999 | Barefoot ..................... 43/25.2 |
| 6,023,876 A | * | 2/2000 | Haddad et al. .............. 43/25.2 |

OTHER PUBLICATIONS

"Hawg Pockets" fishing lure container first sold on Oct. 14, 1997.
"Bait Keeper"—E–Z Fishin, Inc., 1804 S. Hanley, St. Louis, Missouri.
"Lur–Ke Lure Keepers"—Gemini Sport Products, Grand Rapids, Michigan.
The Rod Sheath marketed by Bass Pro Shops before the filing date of the application.
"The Protector" marketed and sold before the filing date of the application.

* cited by examiner

Primary Examiner—Kurt Rowan
(74) Attorney, Agent, or Firm—Kilpatrick Stockton LLP

(57) ABSTRACT

The present invention discloses containers for storing fishing lures, baited or unbaited hooks, terminal tackle, fishing accessories, bait, fishing lines and other fishing devices ("target objects"). The containers are designed for quick and efficient insertion of the target objects into the containers. Fasteners attached to such containers, in addition to closing the opening of the containers, allow for quick attachment and detachment of the containers to and from a fishing rod, thereby capturing and retaining line and thus minimizing entanglement. These fastening devices may also be used to attach the containers to other non-rod objects such as boats or clothing for immediate access to or storage of target objects. All versions of containers may be formed of at least partially clear plastic or other materials for ready identification of the contained materials.

18 Claims, 29 Drawing Sheets

Fig. 25i

| ASPECT | SHAPES | | |
|---|---|---|---|
| dorsal | A (straight) | B (convex) | C (concave) |
| ventral | A (straight) | B (convex) | C (concave) |
| tail | A (straight) | B (convex) | C (concave) |
| lateral | A (straight) | B (convex) | C (concave) |

LATERAL PLAN VIEW example 1.
 dorsal B
 ventral A
 tail B

LATERAL PLAN VIEW example 2.
 dorsal B
 ventral C
 tail A

DORSAL OR VENTRAL PLAN VIEW example 3.
 sides A
 tail B

DORSAL OR VENTRAL PLAN VIEW example 4.
 sides B
 tail A

TUBULAR METHOD

TUBULAR METHOD

DORSAL PORTION SQUEEZED

& VENTRAL PORTION FLATTENED

TUBULAR METHOD

EXCESS MATERIAL TO BE CUT-OFF

SEPARATE-SHEET METHOD

SEPARATE-SHEET METHOD

DORSAL SHEET NARROWED

SEPARATE-SHEET METHOD

EXCESS MATERIAL TO BE CUT-OFF

FISHING DEVICE CONTAINER

This application claims priority to U.S. Provisional Application No. 60/091,153 filed on Jun. 30, 1998 by Walter Louis Meier and Thomas V. Chorey, Jr. entitled "Lure, Hook, Terminal Tackle, Fishing Accessory and Bait Container with Integrated Line Holder," the entire contents of which are incorporated herein.

FIELD OF THE INVENTION

The present invention relates to containers, capable of attaching to a fishing rod, for retaining and storing a variety of fishing devices, including lures, hooks, tackle, and bait.

BACKGROUND OF THE INVENTION

Although fishing is an activity that accompanied the dawn of humankind, recent developments in sportfishing technology continue to increase the odds in favor of the fisherperson. Such developments, which include new lures with multiple hooks, new lines and leaders, use of multiple rigged rods by the same fisherperson, and the unrelenting emphasis on efficient use of time, particularly in tournaments, create amplified needs to reduce inadvertent rod entanglement and snagging of hooks on clothing, fishing line, boats, or other objects. Also, the fisherperson must achieve quick identification and rapid deployment of fishing tackle of all types and descriptions. Snagging or fouling can be merely inconvenient, resulting in wasted time when the fish are biting, or it can present a real safety hazard.

There are two primary sources for this snagging and tangling of rigged fishing rods. The first source is the exposed fishing lures, hooks and terminal tackle items which dangle from the line, creating a hazard to any nearby person or object. The second source is the segment of exposed fishing line which runs down the rod length from the front of the reel to the first rod guide, sufficiently elevated above the rod surface to tangle with other rods, hooks or nearby objects.

The snagging and fouling issue is not entirely bereft of past attention. Generally speaking, conventional responses fall into two categories. One is to use a container for retaining the fishing lures and hooks that are tied onto fishing line. In U.S. Pat. No. 4,203,245 issued to Peterson, for instance, a packet of plastic or other flexible material which may be mounted to a fishing rod for retaining a lure is disclosed. Hook and loop fasteners are employed to wrap the plastic packet around the lure and capture the lure. The Peterson packet is then attached to the rod via a rigid clip. The Peterson packet requires at least three motions using both hands to capture the lure and attach the packet to the rod: one motion to use the fastener to capture the lure within the packet, another motion to apply the rod clip to the packet, and yet another motion to clip the packet to the rod. Such inefficiency consumes valuable time and energy and may result in the loss of a trophy fish. Furthermore, the close proximity of the hook and loop fastener to the contained fishing lure or hooks creates the potential for the lure or hooks to snag and damage the packet's own fastener material. In addition, the action of the rigid clip against the rod on the Peterson device creates a potential for rod scarring and other rod damage. Moreover, because a fisherperson cannot inspect the lure contained in this packet or access it readily, (s)he may not be in position to cast the proper lure at the opportune time. Additionally, the Peterson packet provides no protection to prevent a reel handle or other fishing rig appendage from tangling with the elevated line of an adjacent fishing rod that runs from the reel to the first rod guide. Neither does the Peterson device address the moist environment objective required for scented or chemically treated lures or flesh type bait. Finally, there is no indication that the Peterson device floats, a characteristic which is important to allow retrieval if it is dropped overboard.

Likewise, U.S. Pat. No. 5,131,180 issued to Ives discloses a flexible pouch formed of fabric which may be folded over on a lure in a sandwich fashion. The pouch is secured to the rod or reel via an elastic loop in order to keep the fishing line tight. The Ives device does not solve the problem of the entanglement potential of the exposed line segments which run from the reel to the first rod guide and from the rod tip to the container. Because the device uses a number of hook and loop fasteners as well as a separate elastic attachment, use of the Ives device requires multiple steps involving both of the user's hands to capture and release the lure and attach the pouch to and release the pouch from the rod. Since the Ives device is opaque, there is no immediate visualization of the contained lures, and therefore the user may not immediately recall what lure a particular pouch contains when the need arises for its deployment. The Ives device also creates the potential for hook puncture and entanglement in the pouch fabric and in its hook and loop fastener strip. Additionally, the Ives device is not conducive to holding scented or chemically treated lures or flesh type bait where a moist environment is required. Finally, the Ives device does not float.

Similarly, U.S. Pat. No. 4,418,490 issued to Ancona discloses a two-leaf folder with an outer layer of waterproof material and an inner layer of soft, sponge material which may be folded over on a lure in a sandwich fashion. The lure is captured within the folder, and the folder is then secured to the rod by an extensive hook and loop fastener system surrounding the folder's entire periphery. The Ancona folder appears to be designed primarily to keep its contents moist. The sponge material which comprises its inner layer, as well as its hook and loop fastener system, is extremely likely to result in hook snags, entanglement and puncture of the device itself. The Ancona folder does not address the entanglement problem of the exposed lines. Furthermore, use of the device is tedious and inefficient as its use entails multiple steps requiring both of the user's hands to capture and release the lure and attach the folder to and release the folder from the rod. Moreover, because the Ancona device is opaque, there is no immediate visualization of the contained lures, and therefore the user may not immediately recall what lure a particular folder contains when the need arises for its deployment. Additionally, the Ancona device does not offer the potential for creating a leakproof or near-leakproof environment to meet the objective of marinating lures with scented or chemically treated lures. Finally, there is no indication that the Ancona device floats, a characteristic which is important to allow retrieval if it is dropped overboard.

A second way of addressing the lure and hooks snagging problem involves strapping a lure to a rod using various kinds of hook and loop fasteners, without retaining the lure in a container or a container-like structure. Both U.S. Pat. No. 5,020,264 issued to Demski and U.S. Pat. No. 5,214,874 issued to Faulkner disclose a holder which secures the hook directly to a rod without involving a container. Because the hooks remain exposed with both of these devices, they provide limited protection to keep the lure and hooks from snagging and damaging nearby objects. Furthermore, there is the potential for hooks to tangle in and puncture the holder's own hook and loop fastener material. In addition, because of the devices' extensive hook and loop fastener systems, use of the devices entail multiple steps requiring both of the user's hands to capture and release the lure and attach the folder to and release the folder from the rod. Neither device creates the moist environment required for scented or chemically treated lures or flesh type bait. Finally, neither device is equipped to float, a characteristic which is vital to retrieval if the device is dropped overboard.

A separate approach to the snagging and fouling problem is an elongated plastic tube which fits over the tip of a rod and surrounds a significant portion of the length of the rod, from the tip down, as well as the lure. A plug which captures a lower portion of the rod and fits in the bottom of the tube is subject to inadvertent loosening and escape, particularly when this device is present in a moving trailer, boat or other vehicle or when it is used in windy conditions. Freeing the lure requires manipulation of both ends of the rod, which can be cumbersome in multi-rod environments such as in small fishing boats under tournament or other stressful conditions or when a big fish rises in the area. This approach also requires multiple motions using both hands during insertion and removal of the lure, and due to its large size and wind resistance at the tip of the rod, the device is subject to being blown off the rod by wind forces. This device is also cumbersome to store due to its large size and can be irreparably damaged if stepped on or otherwise mashed. As with the other disclosed devices, this device fails to reduce the line entanglement, lacks the moist environment needed for scented or chemically treated lures or flesh type bait, and does not float.

SUMMARY OF THE INVENTION

The present invention solves the problems described above by providing containers, capable of being attached to a fishing rod in one single-handed motion, which eliminate snagging of hooks, lures, terminal tackle, line and other fishing devices ("target objects), minimize rod and line entanglement, and are simple, compact, durable, unbreakable, buoyant, and transparent and flexible to the extent desired. In accordance with one embodiment of the invention, the container may consist of an elongated and at least partially clear vinyl or other plastic pocket/envelope, featuring two closed or connected sides, preferably a closed or connected bottom, and an at least partially open throat. The overall shape of the invention may resemble that of an elongated fish or shrimp with an accentuated tail and an open mouth.

A target object such as a lure is inserted into the container. The container can be closed or sealed, rendering the container leakproof or nearly-leakproof so that it may hold and accommodate lures that are scented by marinades or chemical treatment and keep bait, including live bait such as shrimp, alive or moist until placed on the hook.

A snap, hook and loop, u-shaped clip or other type of fastener may be attached to the upper portion of the container. Such a fastener serves to close the throat of the container, and to attach the container to the fishing rod and/or reel while simultaneously securing the fishing line to the rod to prevent its entanglement with other rods, reels or nearby objects. A fastening mechanism may also be located in the central region of the container to further secure the container to the rod.

A protuberance with a hook and loop fastener may also be attached to the bottom of the container. As used herein, the term "protuberance" refers to a member that is either part of or intrinsic to an object or attached to or extrinsic to the object. The protuberance may be wrapped around the rod and secured in place with the fastener. A strip of durable, buoyant material, for example a poly foam strip, may be attached transversely across the back of the protuberance to prevent movement of the container along the rod length and to ensure the container floats if dropped in the water. In another embodiment of the present invention, the container is attached to the rod by a hook and loop fastener system and has an additional "wrap strap" which is used to retain the line to the rod above the reel.

The unique structure of the container facilitates capture of target objects and attachment of the container at its top and bottom (and in the middle if one elects to use the middle fastener) to the rod and/or reel with a single-handed sweeping motion. The container attaches to the rod simply by a one-handed manipulation of each fastener rather than by the two-handed motion required with the clamp and the fastener as disclosed in the Peterson patent or the use of multiple fasteners as disclosed in the Ives and Ancona patents. In addition, unlike the Peterson, Demski, Ives and Ancona devices, the present invention stores the contained target objects within the container and simultaneously retains the line segment running from the reel to the first rod guide tightly against the rod, thus eliminating snags and minimizing rod entanglements that otherwise occur from exposed target objects and fishing line. The container may also be attached to a boat, clothing, tackle box or bag or any other object in order to temporarily store alternate target objects or bait to be instantly available and at arms reach at any time.

Accordingly, it is an object of the present invention to provide containers to store target objects of various sizes and shapes, wherein the containers are simple, compact, durable, unbreakable, buoyant, and transparent and flexible to the extent desired.

It is another object of the present invention to provide containers to store target objects which can be quickly and efficiently captured in and released from the containers in a simple one-handed manner.

It is yet another object of the present invention to provide containers which can be quickly and efficiently attached to and detached from a fishing rod in a simple one-handed manner.

It is a further object of the present invention to provide containers that can hold target objects and are attachable to a rod, thereby eliminating snagging of the target objects with nearby objects while simultaneously minimizing rod entanglement by retaining, tightening and isolating the exposed line.

It is an another object of the present invention to provide leakproof or near-leakproof containers to store target objects.

It is another object of the present invention to provide buoyant containers for target object storage that permit the containers to be easily retrieved if dropped in water.

It is yet another object of the present invention to provide transparent containers for target object storage that facilitate identification of the contained items for quick accessibility.

Other objects, features and advantages of the present invention will be apparent with respect to the remainder of this document.

DETAILED DESCRIPTION OF THE DRAWINGS

Figure 1:
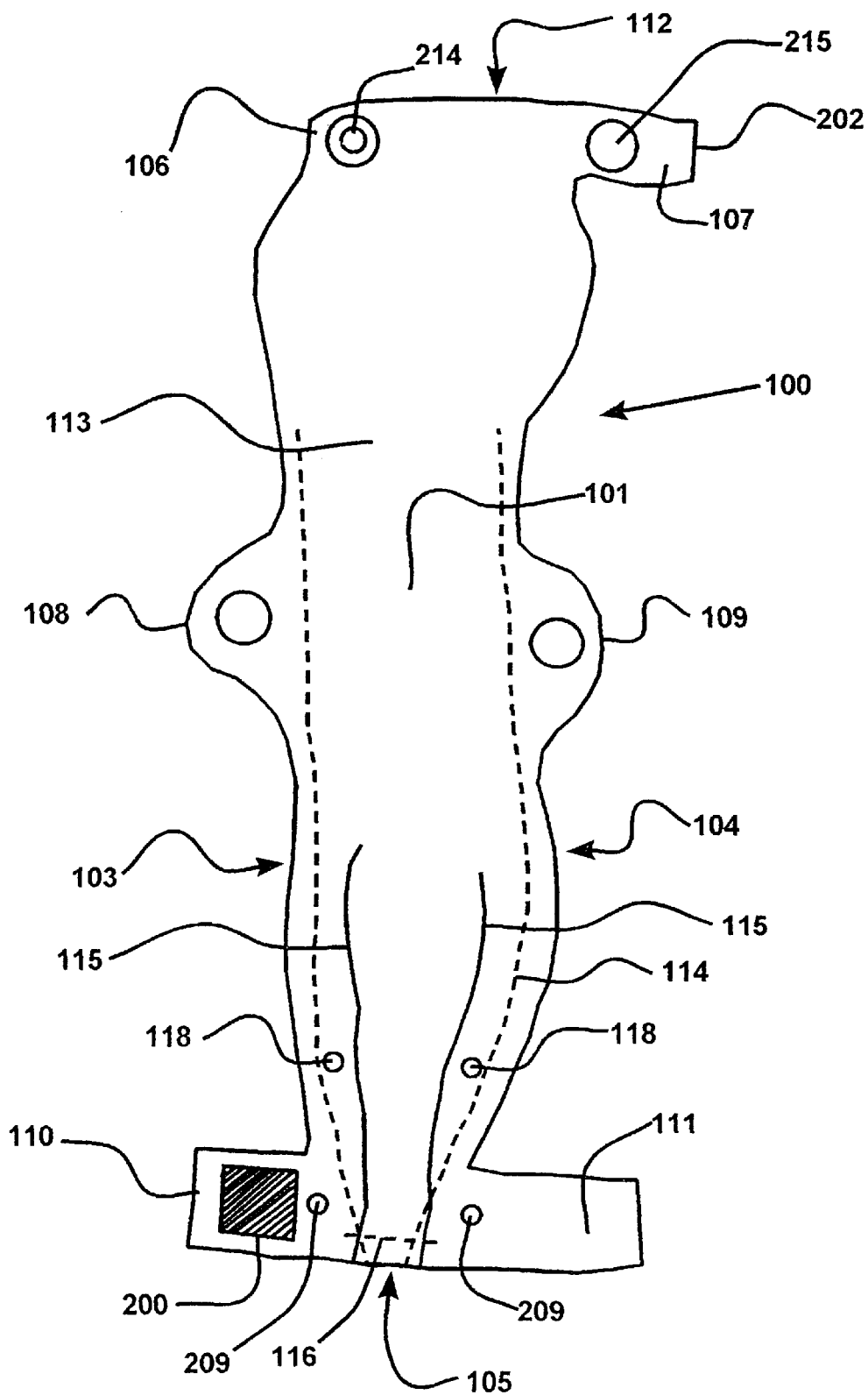
FIG. 1 is a dorsal plan view of one embodiment of an assembled container 100.
Figure 2:
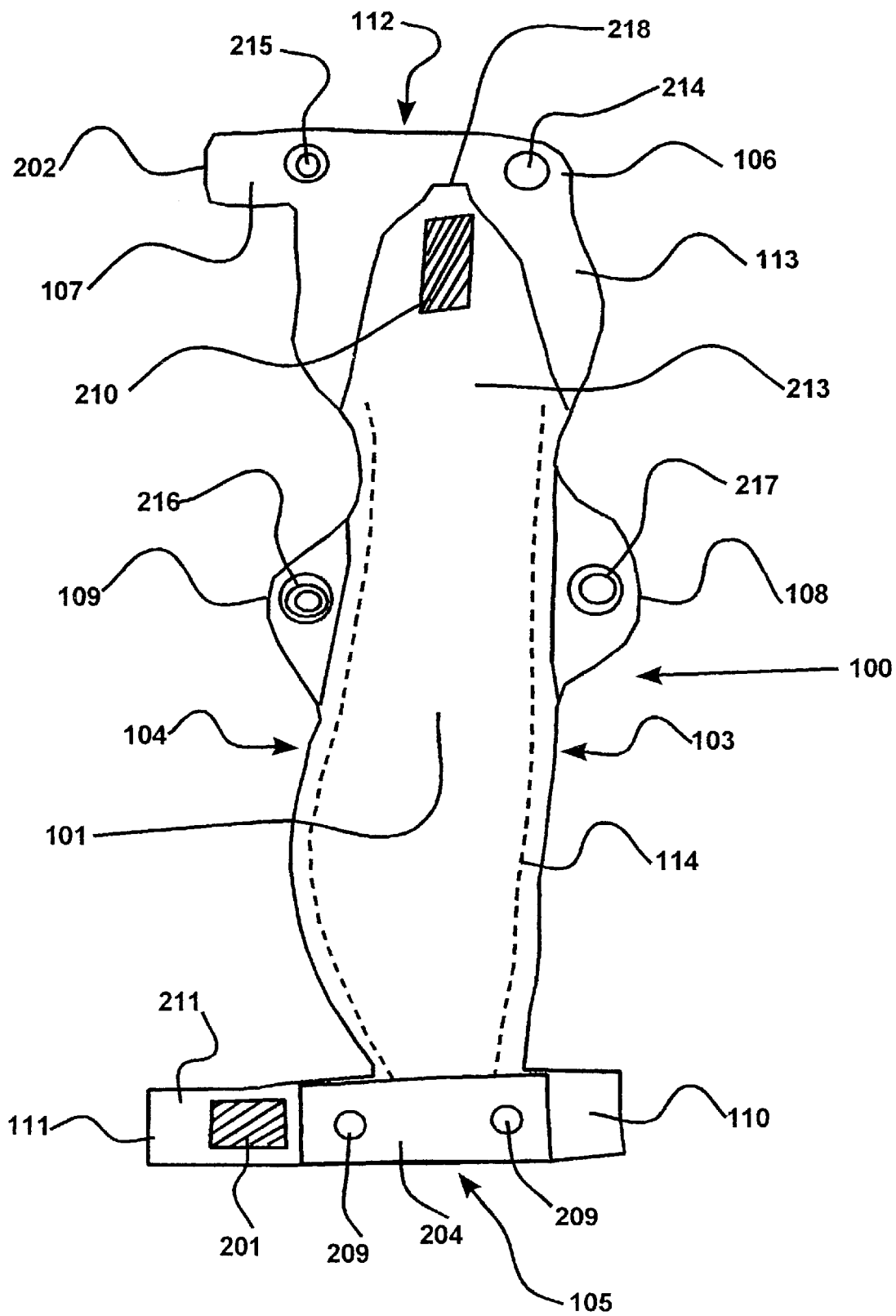
FIG. 2 is a ventral plan view of the embodiment shown in FIG. 1.

Reference will now be made in detail to alternative embodiments of the present invention. FIGS. 1 and 2 illustrate a container 100 according to one embodiment comprising an elongated body portion 101 having a dorsal portion 113 and ventral portion 213, two partially or fully closed sides 103 and 104, a top 112, and a bottom 105. The body 101, similar to a fish, has a hollow space or belly cavity 207 (FIG. 3) to receive target objects.

Figure 4:
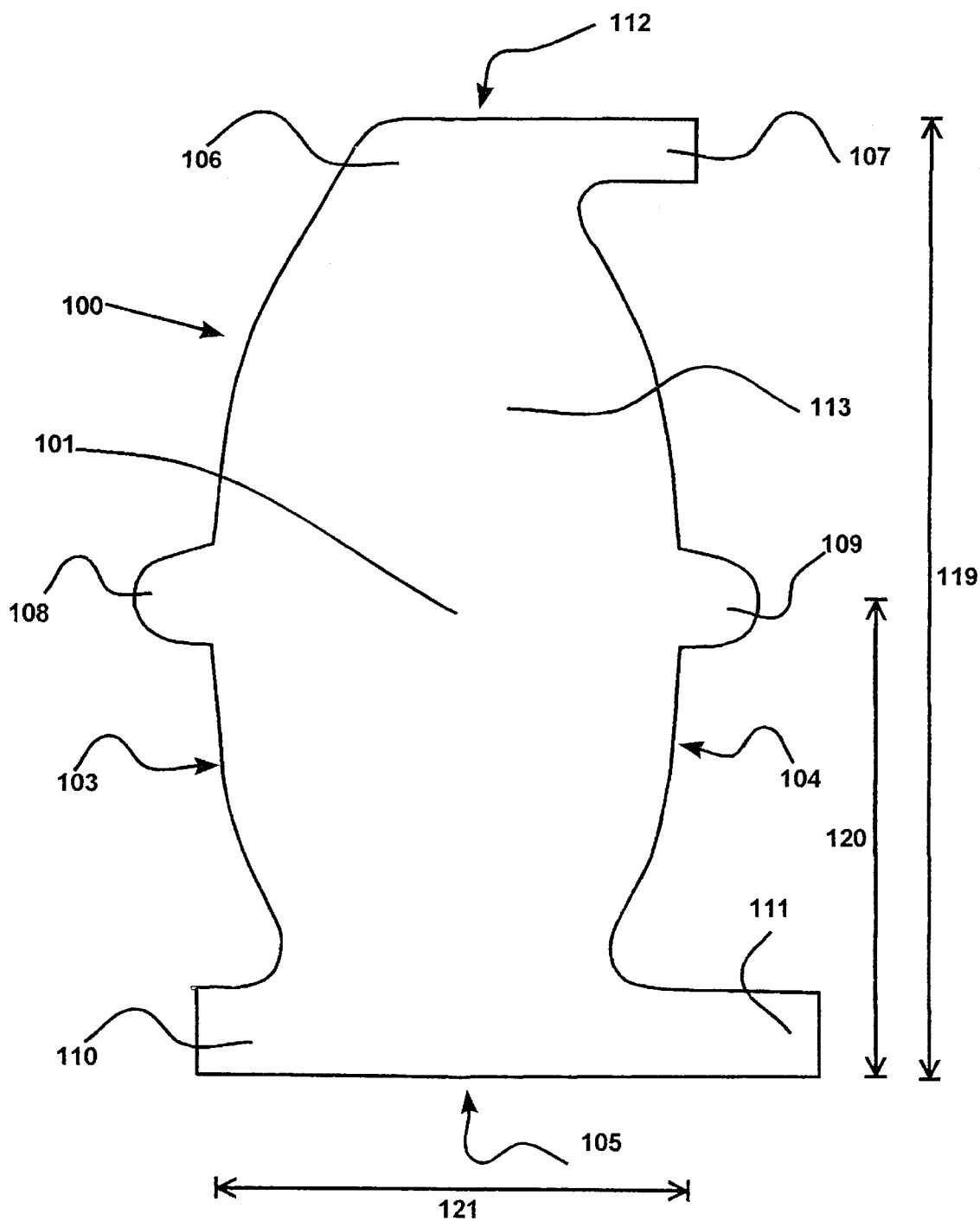
FIG. 4 is a plan view of the outside surface of the unassembled dorsal portion of the embodiment shown in FIG. 1.
Figure 5:
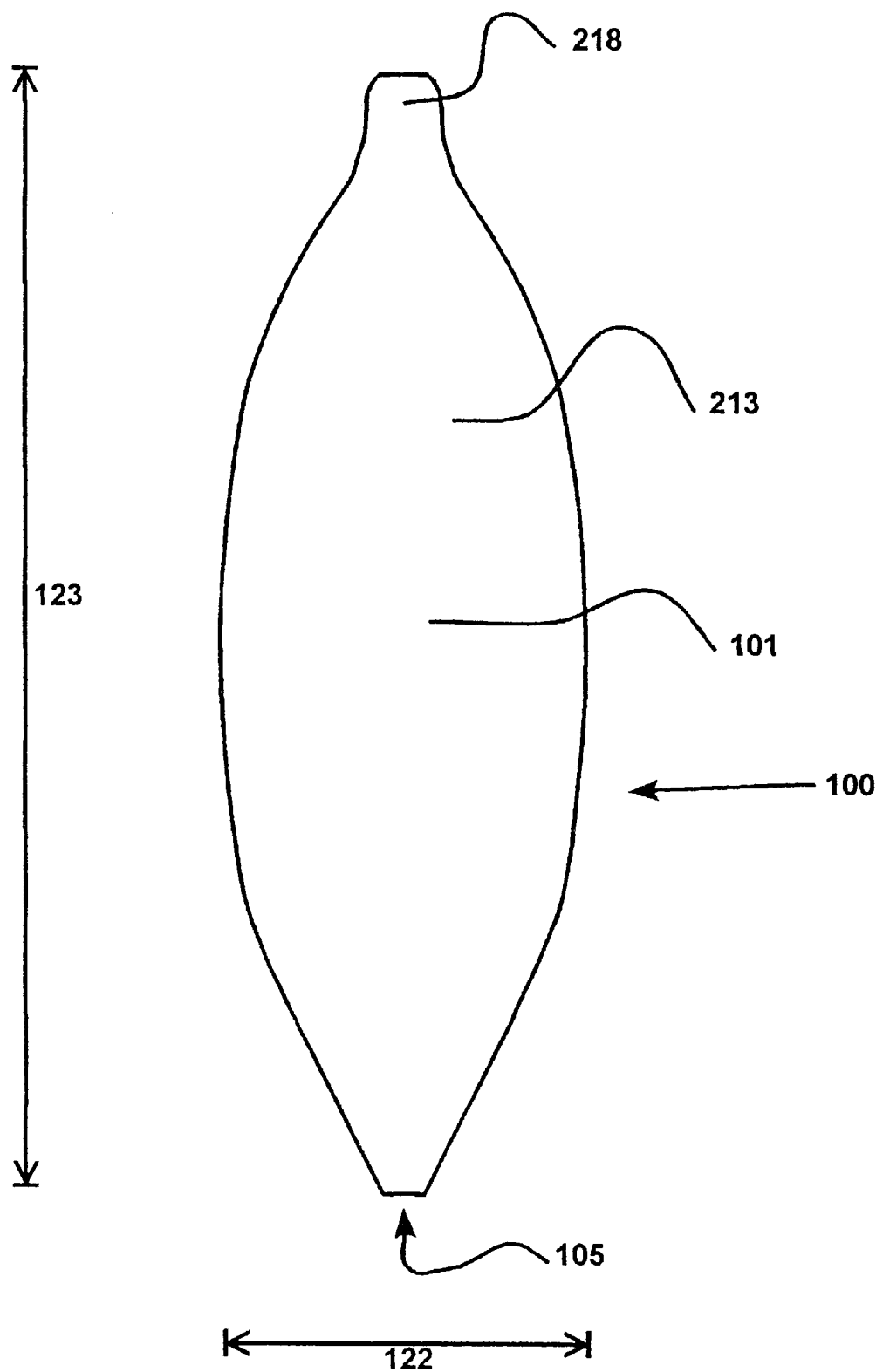
FIG. 5 is a plan view of the unassembled ventral portion of the embodiment shown in FIG. 2.

FIGS. 4 and 5 show the general structure of the dorsal 113 and ventral 213 portions, respectively. The dorsal portion 113 (FIG. 4) contains two top protuberances 106, 107, two middle protuberances 108, 109, and two bottom protuberances 110, 111. The biconvex width 121 of the dorsal portion 113 on this embodiment is 5", and the length 119 is 11". These dimensions may vary, depending on the size and shape of the intended target objects.

The rounded top left rudimentary protuberance 106 on this embodiment is approximately ½" in length and contains a top male snap or fastener 214 (FIG. 1) on the dorsal surface. The top right protuberance 107, which has a squared edge, is approximately 1" long×¾" wide and has a complementary top female snap or fastener 215 (FIG. 2) on the ventral surface. The distance between the fasteners 214, 215 is approximately 2½", slightly longer than the circumference of most rods. The fasteners 214, 215 can be used to close the container 100. Moreover, the top left and right protuberances 106, 107 on this embodiment wrap around a rod and lines and are secured using fasteners 214, 215, thus attaching the container 100 to the rod. The length of the top right protuberance 107 lateral to the snap on this embodiment serves as a tab 202 for easy grasping when affixing and removing the container 100 to and from the rod.

The middle protuberances 108, 109 on this embodiment are located approximately midway from the top 112 and bottom 105, a span 120 of approximately 5½" (FIG. 4). They may have rounded edges and are approximately 1" in diameter. A male snap 216 and female snap 217 (FIG. 2), for use in attaching the container 100 to a rod, may be attached centrally on the ventral surface of the middle protuberances 108, 109.

The bottom left protuberance 110 (FIGS. 1 & 2) may have squared edges and is approximately 2" long×1" wide on this embodiment, and a hook or loop fastener 200, approximately 1" long×¾" wide, is attached to the dorsal lateral portion of the bottom left protuberance 110. The bottom right protuberance 111 on this embodiment has squared edges, is approximately 4" long×1" wide, and a hook or loop fastener 201, approximately 1½" long×¾" wide, is attached to the ventral surface of the bottom right protuberance 111, approximately 1" from the lateral edge, providing an approximate 1" tab 211 for easy grasping. The hook and loop fasteners 200, 201 can be attached to the protuberance by adhesive backing or other techniques including bonding, and may be reinforced by sewing and/or grommets, rivets, or other techniques. Naturally, for adherence purposes, if a hook fastener is used on the bottom left protuberance 110, then a loop fastener should be used on the bottom right protuberance 111, and vice versa. The bottom left and right protuberances 110, 111 wrap around the rod and line and are secured using the hook and loop fastener 200, 201.

An approximately 4" long×1" wide×⅜" thick strip of flotation material 204 (FIG. 2), which may be, for instance, poly foam, may be attached transversely and centrally across the bottom 105 of the container 100 with two rivets 209 or other fasteners. The strip 204 provides buoyancy for the container 100 should it fall in the water and facilitates adherence of the container 100 to the rod to prevent movement of the container 100 along the rod.

Figure 3:
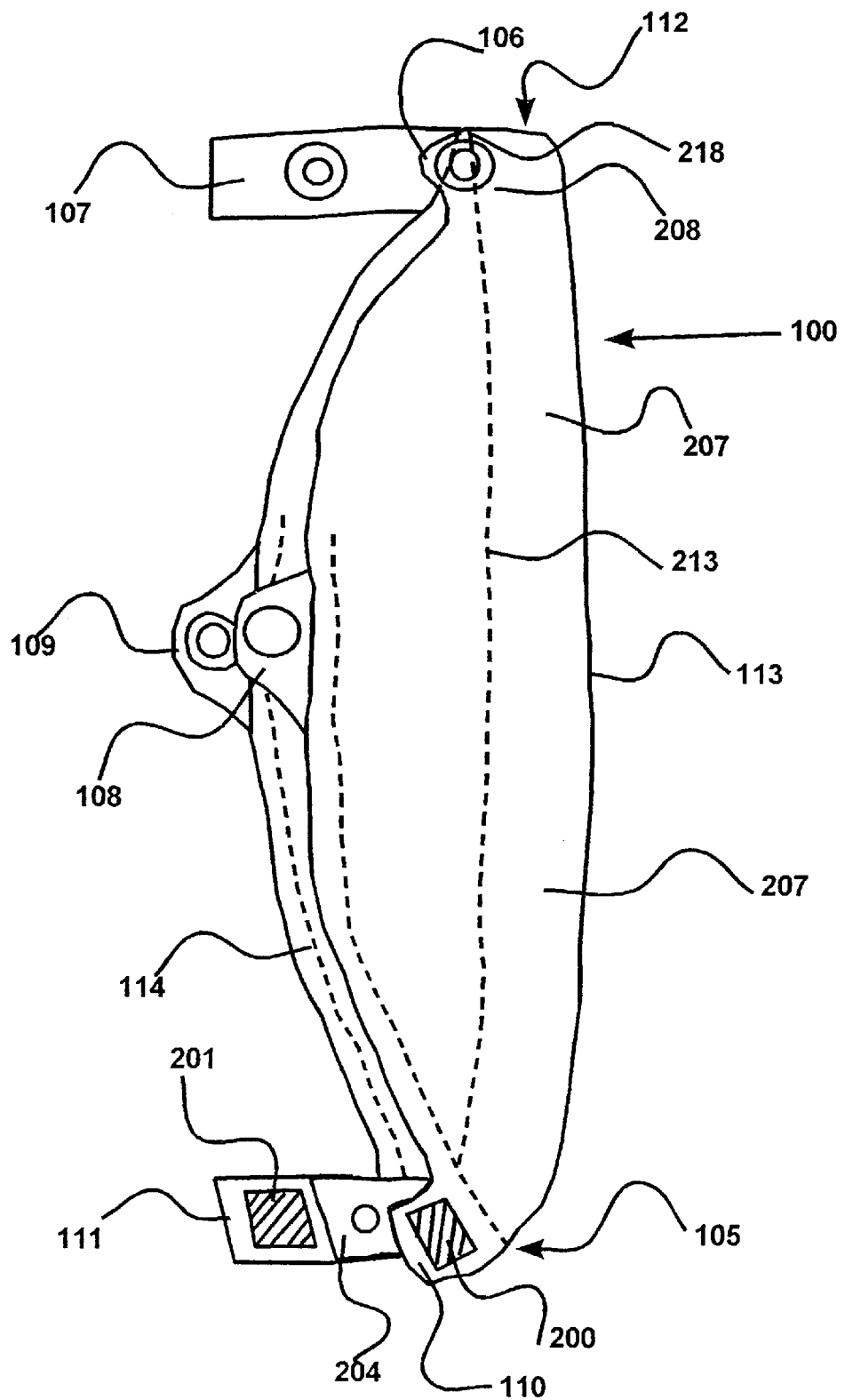
FIG. 3 is a lateral side plan view of the left side of the embodiment shown in FIG. 1.

FIG. 5 illustrates the general structure and dimensions of the ventral portion 213. The ventral portion 213 on this embodiment is approximately 1½" narrower than the dorsal portion 113 (FIG. 4). In unassembled form, the ventral portion's 213 biconvex width 122 on this embodiment is approximately 3½" and length 123 is approximately 10½". For longer and larger lures, hooks and terminal tackle, the length and width may be extended. The upper part of the ventral portion 213 may be tapered, forming a tongue-like flap 218 at the throat 208. In use, this flap can be bent down with one finger of the hand holding the container 100 to guide a target object into the throat 208 of the container 100 (FIG. 3). The right and left, top and bottom protuberances 106, 107, 110, 111 may be partially or completely reversed in a mirror image fashion, thus creating an opposite hand version of the container 100.

The dorsal and ventral portions 113, 213 may be made from transparent or opaque, flexible material. The transparency of the material ensures that the user can quickly and easily identify which target objects the container 100 holds. If the fisherperson, however, prefers that the contents of the container 100 not be readily apparent to a competitor, opaque material may be used. A flexible yet relatively thick container 100 ensures that it can be attached to the rod and/or reel easily with no penetration by hooks or other contained objects. Various materials may be used, such as a partially clear vinyl in the range of gauge 15 to 40.

The dorsal portion 113 and the ventral portion 213 as shown in FIGS. 2 & 3) on this embodiment are at least partially united along the sides by sewing or stitching 114. Other union techniques or devices such as gluing, folding, riveting, laminating, RF dielectric welding, or heat bonding, may also be used. In one manufacturing process, the right sides 104 of the dorsal and ventral portions 113 and 213 are brought together and stitched, beginning approximately 1" above the middle right protuberance 109 and ending at the bottom 105. The left sides 103 are brought together and stitching is begun approximately 1" above the left middle protuberance 108 and ends at the bottom 105. The stitch 114 stays approximately 3/16" from the edges of the sides 103 and 104. At the upper starting points, a rivet, grommet or other fastener may be used for additional strength or decorative purposes. A preferred sewing thread is strong, waterproof, and heat-resistant.

The two sides 103 and 104 on this embodiment are connected by a bottom 105. The bottom 105 may remain open, or it may be closed by stitching, sealing, gluing, through the use of an additional piece of material, or as otherwise desired. The bottom may be closed by pressing the wider dorsal portion 113 to the narrower ventral portion 213, which may create a symmetrical pleat on each side 115 (FIG. 1). The bottom 105 may then be secured by a transverse stitch 116 approximately 3/16" from the edge. A rivet, grommet or other fastener or glue may be used in lieu of the above or for additional security or for decorative purposes.

The union of the sides 103, 104 but not the tops of the dorsal and ventral portions 113, 213 creates a wide throat 208 (FIG. 3) for quick insertion of the target objects into the container 100. This wide throat 208, combined with the tongue-like flap 218 of the ventral portion 213 which can be bent back to help open the throat 208, enables the user to easily guide the target objects into the hollow belly cavity 207 (FIG. 3) of the container 100 using only a single hand.

Additional fasteners, e.g., buttons or snaps, may be attached to the throat 208 in order to better secure its closure and contents. It may be desirable to use a fastener system to close the throat 208 with a leakproof seal so that the container 100 may hold and accommodate lures that are scented by marinades or chemical treatment and keep bait, including live bait such as shrimp, alive or moist until placed on the hook. However, it may not be desirable to add structure which can cause snagging or entanglement with target objects.

According to this embodiment of the present invention 100, optional openings or holes 118 (FIG. 1) may be punched or otherwise formed at the body portion 101 to allow extra air circulation and moisture dissipation. The locations of the openings 118 may be varied, but are preferably above the bottom 105 and below the throat 208. The size of the openings 118 should be sufficient to allow air circulation and moisture dissipation, yet small enough to prevent the target objects from snagging on or protruding from the openings 118.

Once the target objects are contained within the hollow belly cavity 207, the throat 208 can be closed using snaps or other fasteners 214, 215 located on the top protuberances 106, 107, as shown in FIGS. 1 & 2, or by other structures, such as zip lock or press lock fastener systems. The closure seal may be of varying degrees of tightness, depending upon the type of fastener system used.

The container 100 may be attached to a rod using the fasteners 214, 215, 216, 217, 200, 201 located on the top, middle, and bottom protuberances 106, 107, 108, 109, 110, 111. The protuberances may wrap around the rod and line(s) where they may be secured with their respective fasteners. The top right protuberance 107 may wrap around the rod and/or reel and lines, and the tab 202 can allow quick one-handed unsnapping to detach the container 100 from the rod. The bottom right protuberance 111 can wrap around the rod foregrip and/or reel and line immediately above the reel to tightly retain it to the rod and/or reel, to prevent entanglement of the rod with other rods or objects, and to prevent upward movement of the container 100 on the rod. A short tab 211 can allow quick one-handed detachment of the hook and loop fastener 200, 201 during active fishing. Not all fasteners need to be used to secure the container to the rod.

A common problem with fishing accessories is that they have the propensity to escape from the boat or otherwise become misplaced when not in use. In accordance with this embodiment of the present invention 100, a hook or loop fastener 210 (FIG. 2) approximately 1½" long×¾" wide attached to the outer surface of the upper ventral portion 213 near the tongue-like flap 218 may allow the container 100 to be easily attached in the upright position to another container or to a strip of hook or loop type fastener mounted to the fishing boat, tackle box, the wearer's vest, belt, other clothing appendage or other surface. The container 100 may also be secured in an upside down position by attaching the hook or loop fasteners 200, 201 to a corresponding strip of hook or loop fastener mounted on a fishing boat, tackle box, the user's vest, belt, other clothing appendage, or other surface. The snap fasteners 214, 215, 216, 217 of the upper or middle protuberances 106, 107, 108, 109 may also be attached to opposite gender snaps located on an attachment surface. Also, a hole or grommet may be placed on the upper portion of the container 100, for example on the upper ventral portion 213 near the tongue-like flap 218, so that the container may be hung on a nail, hook or other hanging device.

Figure 35:
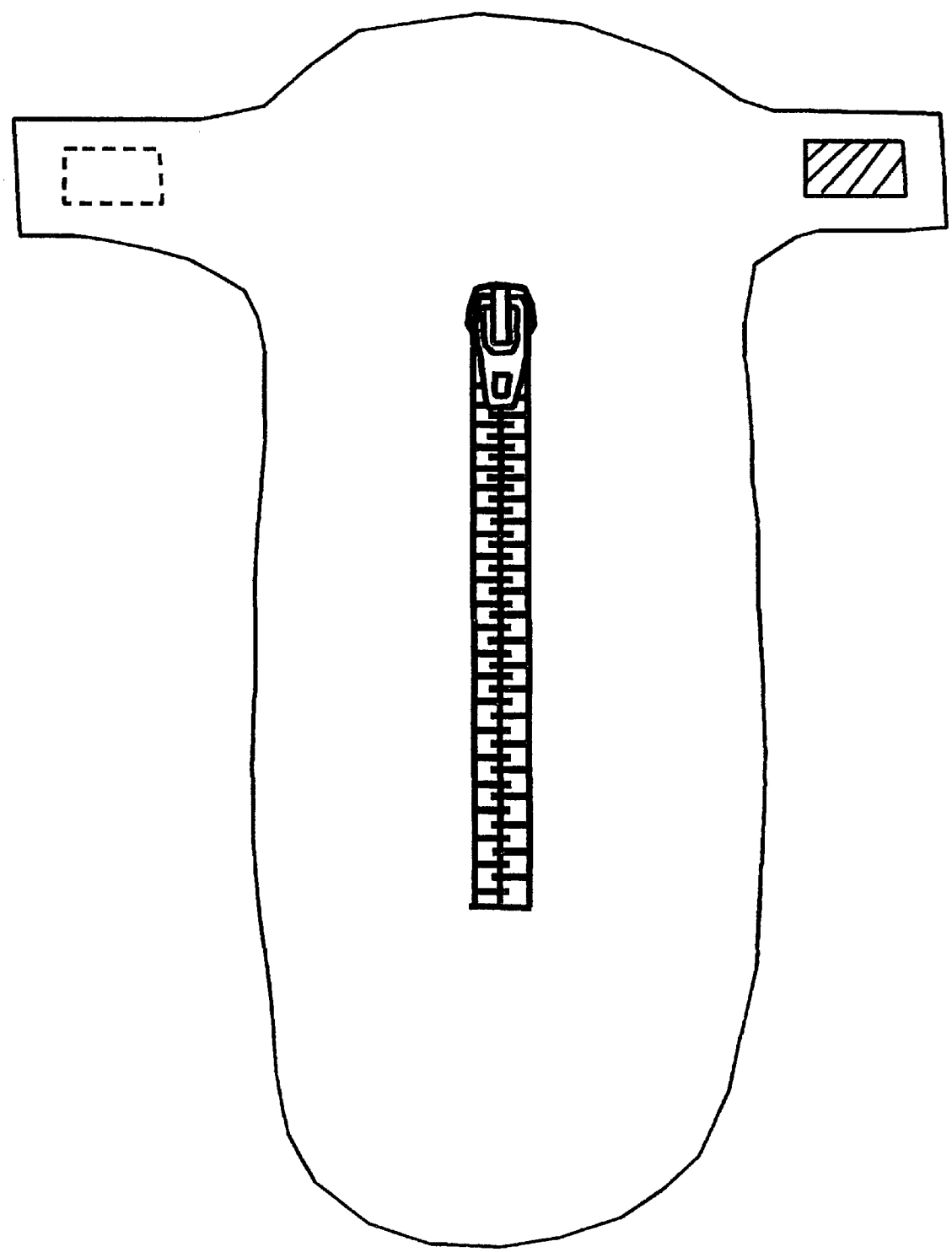
FIG. 35 is a schematic plan view of an embodiment of a container that includes a zipper or elongated fastener opening.

Although the embodiment of the present 100 discussed above has an opening for receiving the fishing device at the top of the container, such an opening may appear elsewhere. For example, FIG. 35 is a schematic view that shows an embodiment of a container according to the present invention with an opening adapted to receive target objects and not located at the top of the container. In FIG. 35, the opening is located in the approximate mid-portion of the container, and the opening is closed using a zipper. FIG. 35 is merely one example of the various locations where the opening could be placed and how it could be formed and closed or partially closed. Metal or plastic zippers, elongated fasteners such as are found on plastic freezer bags, or other fastening devices could be used for the opening (or indeed for any of the fasteners mentioned in this document).

Figure 6:
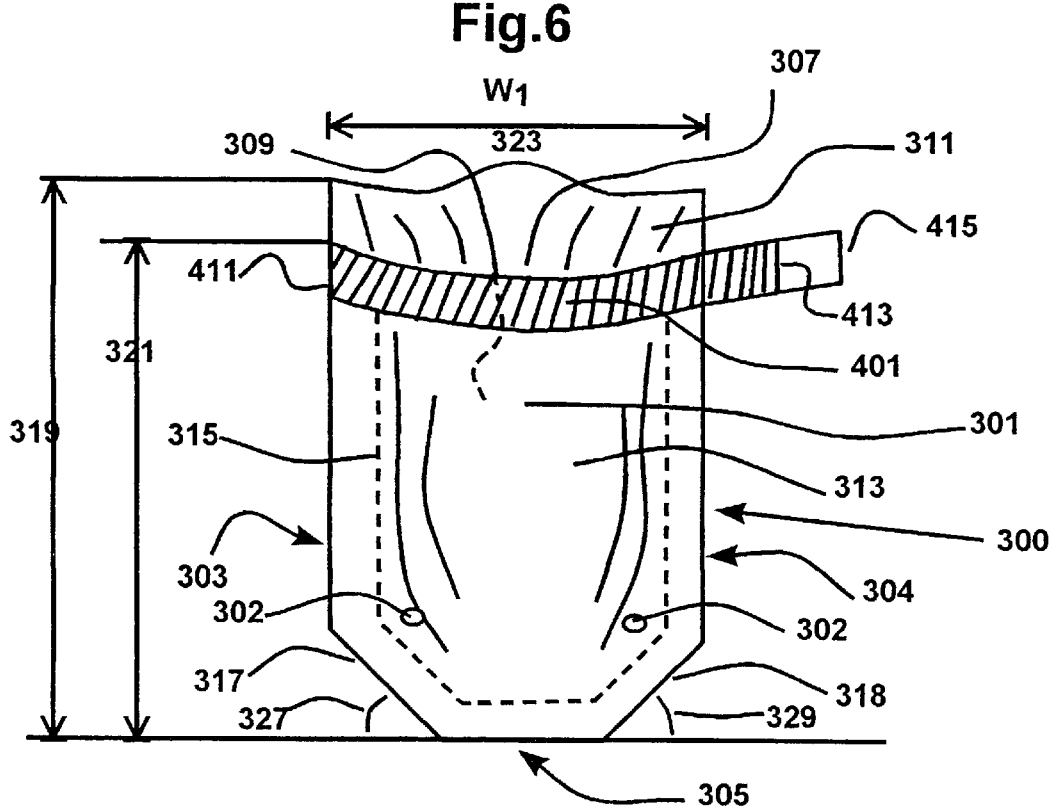
FIG. 6 is a front plan view of another embodiment of an assembled empty container 300.
Figure 7:
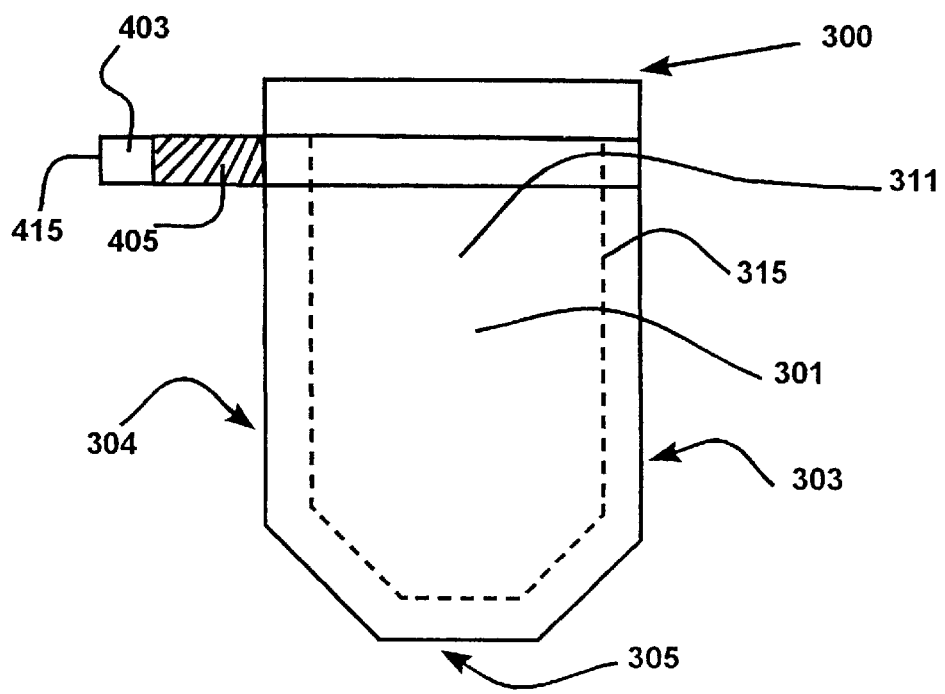
FIG. 7 is a back plan view of the embodiment shown in FIG. 6.

FIGS. 6–13 show an alternative embodiment of a container 300 in accordance with the present invention. FIGS. 6 and 7 illustrate a container 300 comprising a body portion 301 having a front 313 and back 311 panel, two partially or fully joined or united sides 303 and 304, a bottom 305, a throat 307, and a hook and loop fastener system 400 (FIGS. 8, 9, 10) attached at the throat 307. The body portion 301, much like an envelope or pocket, has a hollow space 309 (FIG. 6), when opened, to receive target objects.

FIGS. 6 and 7 on this embodiment show the general structure of the front 313 and back 311 panels, respectively. The panels 311, 313 are generally rectangular, but may have clipped or rounded corners to minimize scratch or puncture potential. While the panels 311, 313 may be different sizes, on this embodiment the front panel 313 has substantially the same width as the back panel 311, while the back panel 311 is slightly longer than the front panel 313, creating a type of scoop effect to better receive target objects. Most target objects can be contained in a container 300 having a back panel 311 with length 319×width 323 (on this embodiment, in the approximate dimensions of 8"×5"), and a front panel 313 with length 321×width 323 (on this embodiment, in the approximate dimensions of 7 (⅜)"×5"). For longer or larger target objects, a larger container, for example a 12"×5" container, may be used.

The panels 311, 313 may be made from various degrees of transparent to opaque materials and from various degrees of rigid to flexible materials. The transparency of the material ensures that the user can quickly and easily identify which target objects the container 300 holds. If the fisherperson, however, prefers that the contents of the container 300 not be readily apparent to a competitor, a more opaque material may be used. A flexible yet relatively thick container 300 ensures that it can be attached to the rod and/or reel easily with no penetration by hooks or other contained objects. Various materials may be used, but on this embodiment a partially clear vinyl in the range of gauge 15 to 40 is used.

The back panel 311 and the front panel 313 on this embodiment may be united at least partially along the sides by sewing or stitching 315. Other union techniques or devices such as gluing, folding, riveting, laminating, RF dielectric welding, or heat bonding, may also be used. The stitch 315 on this embodiment 300 generally begins on the left side 303 near the throat 307 and ends on the right side 304 near the throat 307, or vice-versa. In doing so, the stitch 315 on this embodiment is approximately ¼" away from the edges of the sides 303, 304 and the bottom 305; and the starting and ending threads run vertically across the loop fastener 401, which is attached to the front panel 313. A preferred sewing thread is strong, waterproof, and heat-resistant.

The two sides 303 and 304 are connected by a bottom 305. The bottom 305 can be squared, rounded, or of other desired shapes. On this embodiment 300, as shown in FIG. 6, the bottom 305 has a bottom left corner 317 and a bottom right corner 318. The bottom left corner 317 is formed by cutting off the corner at the intersection of the bottom 305 and the left side 303. Similarly, the bottom right corner 318 is formed by cutting off the corner at the intersection of the bottom 305 and the right side 304. Removal of the corners 317, 318 may be encouraged as it eliminates potential snagging of the container 300 with the line, hooks, clothing, hands, or other objects in the vicinity.

On this embodiment, the two bottom corners 317, 318 are substantially symmetric with respect to a central axis (not shown) perpendicular to the bottom 305; and each bottom corner 317, 318 forms an acute angle 327, 329 with respect to the bottom 305. The bottom 305 and the two bottom corners 317, 318 are approximately equal in length on this embodiment, approximately 2"; moreover, the left acute angle 327 and the right acute angle 329 are approximately equal to 45°. Such symmetry enhances the overall aesthetic appeal of the container 300. The bottom 305 may remain open, or it may be closed by stitching, sealing, gluing, through the use of an additional piece of material, or as otherwise desired.

The union of the sides 303, 304 but not the tops of the panels 311, 313 creates a wide throat 307 (FIG. 6) for quick insertion of the target objects into the container 300. This wide throat 307 enables the user to easily and single-handedly guide the target objects into the hollow space 309 of the container 300 created by squeezing the sides 303, 304 or by inserting the target objects directly into the throat 307.

Additional fasteners, e.g., buttons or snaps, may be attached to the throat 307 in order to better secure its closure and contents. In addition, it may be desirable to use a fastener system to close the throat 307 with a leakproof or partially leakproof seal so that the container 300 may hold and accommodate lures that are scented by marinades or chemical treatment and keep bait, including live bait such as shrimp, alive or moist until placed on the hook. However, it may not be desirable to add structure which can cause snagging or entanglement with target objects.

According to this embodiment of the present invention 300, optional openings or holes 302 (FIG. 6) may be punched or otherwise formed at the body portion 301 to allow extra air circulation and moisture dissipation. The locations of the openings 302 may be varied but are preferably above the bottom 305 and below the throat 307. The size of the openings 302 should be sufficient to allow air circulation and moisture dissipation, yet small enough to prevent the target objects from snagging on or protruding from the openings 302.

Figure 8:
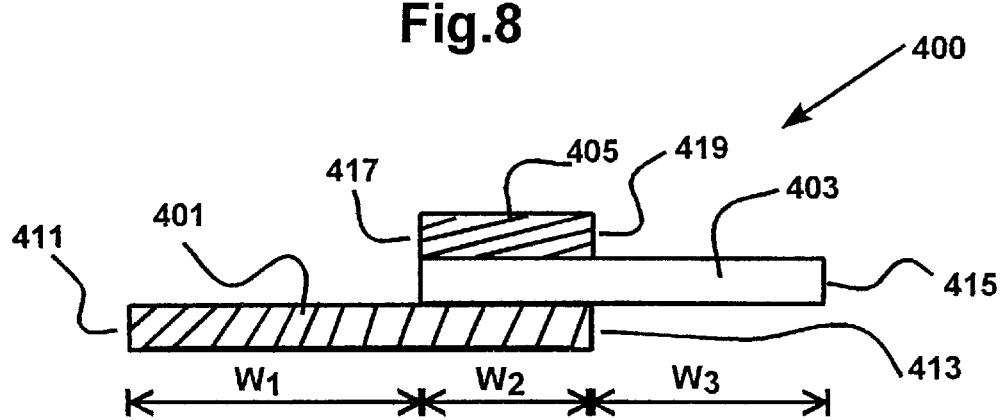
FIG. 8 is a side plan view of the hook and loop fastener system 400 isolated from the container 300 shown in FIGS. 6 and 7.
Figure 9:
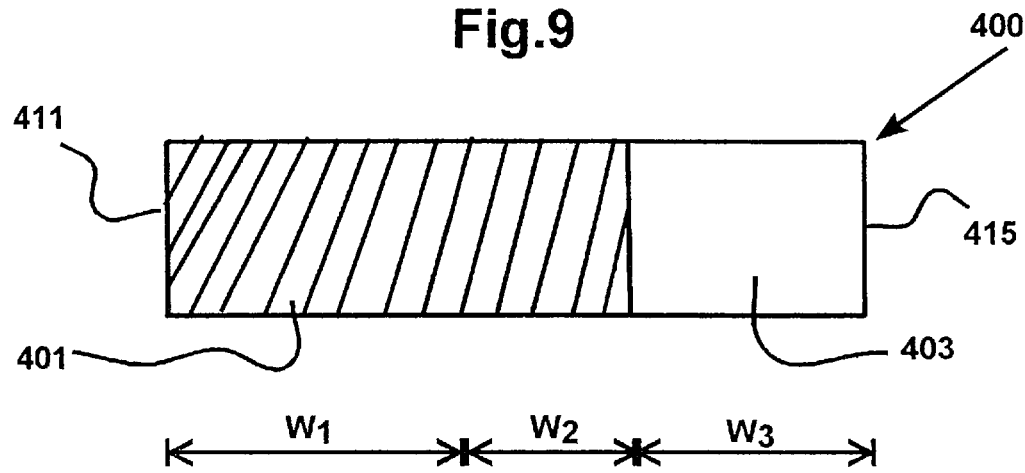
FIG. 9 is a front plan view of the hook and loop fastener system 400 shown in FIG. 8.
Figure 10:
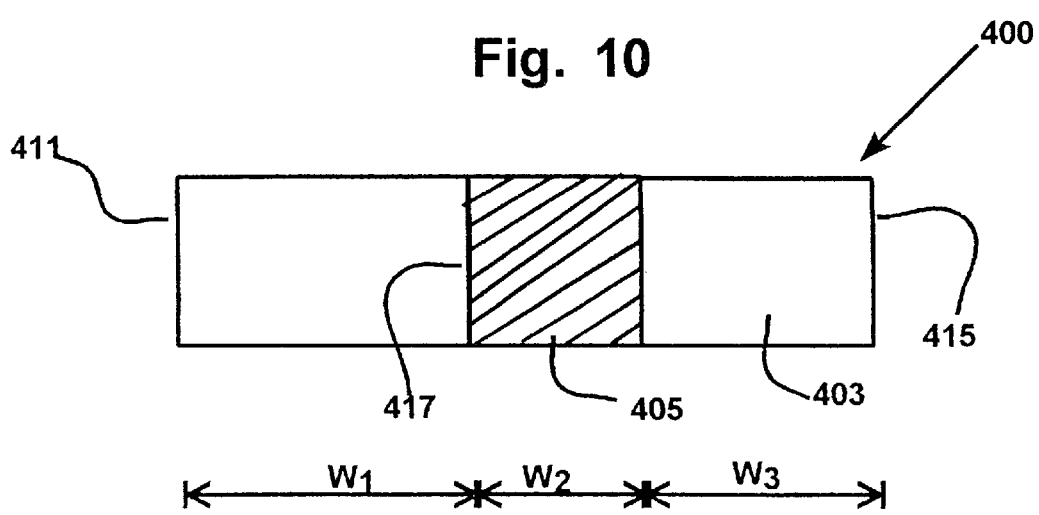
FIG. 10 is a back plan view of the hook and loop fastener system 400 shown in FIG. 8.

Once the target object is contained within the hollow space 309, the throat 307 can be closed, for example, by a hook and loop fastener system 400 (FIGS. 8,9,10). On this embodiment, the loop fastener 401 is mounted on the front panel 313 near the throat 307. The hook and loop fastener system 400 may be comprised of a loop fastener 401 and a hook fastener 405 and may have two ends 411, 415. One end 411 may be aligned with left side 303 of the container 300. The other end 415 may extend beyond the edge of the right side 304. Note that while FIG. 6 depicts the hook and loop fastener system 400 aligned with the left side 303, the hook and loop fastener system 400 can be aligned with the right side 304 to accommodate opposite-handed persons.

FIGS. 8–10 show the side, front, and back views, respectively, of the hook and loop fastener system 400 that is attached on the depicted embodiment of the container 300. The depicted hook and loop fastener system 400 has a "sandwich" structure. A flexible panel 403 is "sandwiched" between a loop fastener 401 and a hook fastener 405. The loop fastener 401 is longer than the width 323 (FIG. 6) of the body portion 301 of the container 300 so that when the end 411 of the loop fastener 401 is aligned with the left side 303, the other end 413 of the loop fastener 401 extends beyond the right side 304 of the container 300. The length of the loop fastener 401 can be expressed as the sum of W1+W2, where W1 is the width 323 of the body portion 301 of the container 300 and W2 is the distance between the right side 304 and the end 413 of the loop fastener 401. On this embodiment, W1 is about 5", and W2 is about 2.5", although these dimensions may be varied for different applications.

On this embodiment, the length of the hook fastener 405 is W2 so that the end 419 of the hook fastener 405 is aligned with the end 413 of the loop fastener when they are attached together with the flexible panel 403 as shown in FIG. 8. On this embodiment, the loop fastener 401 and the hook fastener 405 are approximately ¾" wide and are substantially equal in width. The flexible panel 403 has a length of W2+W3, where W3 is the distance measured from the end 415 of the flexible panel 403 to the end 413 of the loop fastener 401. On this embodiment, W2 is approximately 2.5" and W3 is approximately 3.5", and while the width of the flexible panel 403 can be varied, it has substantially the same width as the loop fastener 401 as well as the hook fastener 405. It may be possible for the panel 415 and/or the hook fastener 405 to overlap the margins of front panel 313 and back panel 311; however, this configuration may result in undesired thickness and bunching of the container at the throat during rod attachment. Conversely, it may be possible for the loop fastener 401 not to overlap the back panel 311 or the front panel 313; however, this configuration would offer a limited surface for fastener attachment of various rod sizes. The hook and loop fastener materials on hook and loop fastener system 400 may be reversed in position as desired to meet design objectives. The flexible panel 403 can be made from various flexible materials such as plastics, man-made leather, natural leather, or fabrics. On this embodiment, gauge 19 clear vinyl is used. The flexible panel 403 is sandwiched between, and may be attached to, the loop fastener 401 and the hook fastener 405 by gluing, sewing, laminating or other means to form the hook and loop fastener system 400.

After the target objects are in the container 300, the hook fastener 405 is wrapped around the rod and attaches to the loop fastener 401 in order to secure, in one motion, both the target object(s) in the container 300 and the container 300 to the rod. Although it is not necessary for the hook and loop fastener system 400 to have a flexible panel in order to attain single motion functionality, the flexible panel 403 ensures easy grasping for placement on and removal of the container 300 from the rod.

This container 300, like the container 100 shown in FIGS. 1–5, can be adapted with hook and loop fasteners or other appropriate fastener systems to be attachable to any convenient surface, such as a boat or the user's vest, belt, or other clothing appendages.

Figure 11:
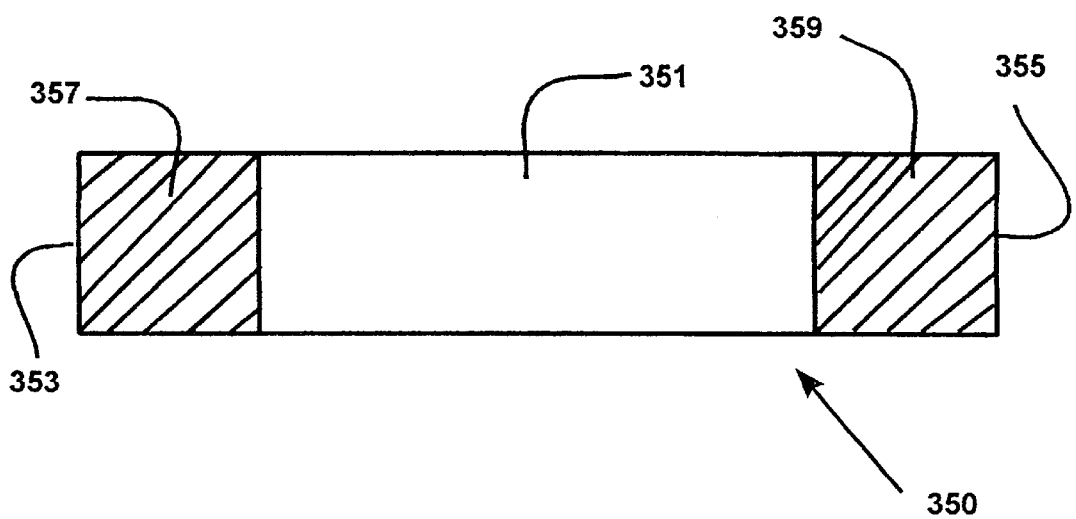
FIG. 11 is a plan view of the front side of a wrap strap 350 according to another embodiment of the present invention.
Figure 12:
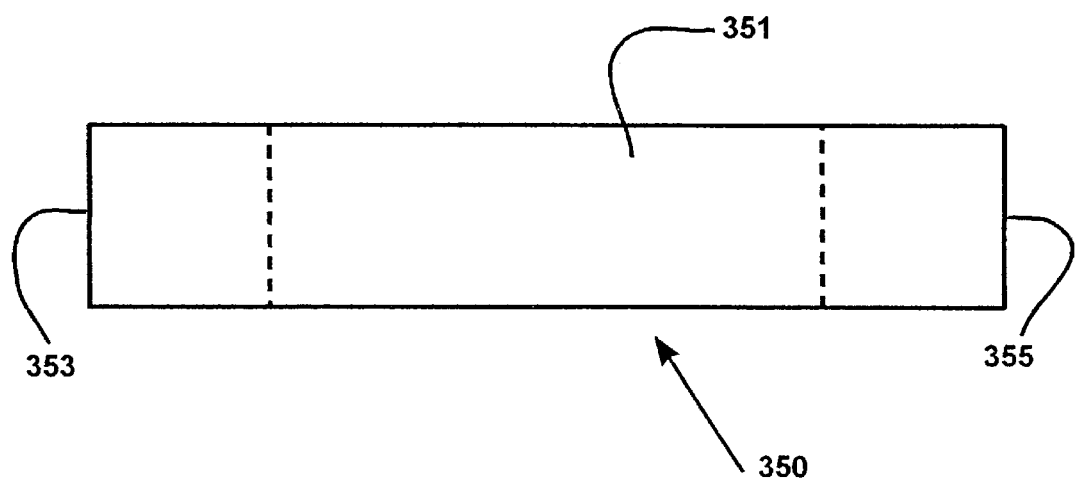
FIG. 12 is a plan view of the back side of the wrap strap 350 shown in FIG. 11.

Another component of the present invention 300, illustrated in FIGS. 11 and 12, is a wrap-strap or an elongated attachable strap 350 shown in front and back plan view, respectively. The strap 350 has a panel 351 with two ends 353 and 355 (FIG. 11). The panel 351 of the depicted strap generally is a long, flexible belt. A hook fastener 357 is mounted on the front side of the depicted strap at the end 353 of panel 351, and a similar hook fastener 359, which may be of the same or different size, is mounted on the front side at the end 355 of panel 351. The different types of fasteners on the respective sides may obviously be reversed, as in the case of all hook and loop fasteners and all other gender fasteners mentioned throughout this document.

The panel 351 of the depicted strap may be flexible and tough. The strap 350 and its components may come in various sizes and materials. On this embodiment, gauge 19 vinyl is used, the panel 351 is approximately ¾" wide×12" long, and the hook fasteners 357 and 359 are approximately ¾" wide×1" long. The hook fasteners 357 and 359 may be attached to the panel 351 in various ways or locations. On this embodiment 350, they are sewn to the panel 351 to form the wrap strap 350 shown in FIGS. 11–12.

Figure 13:
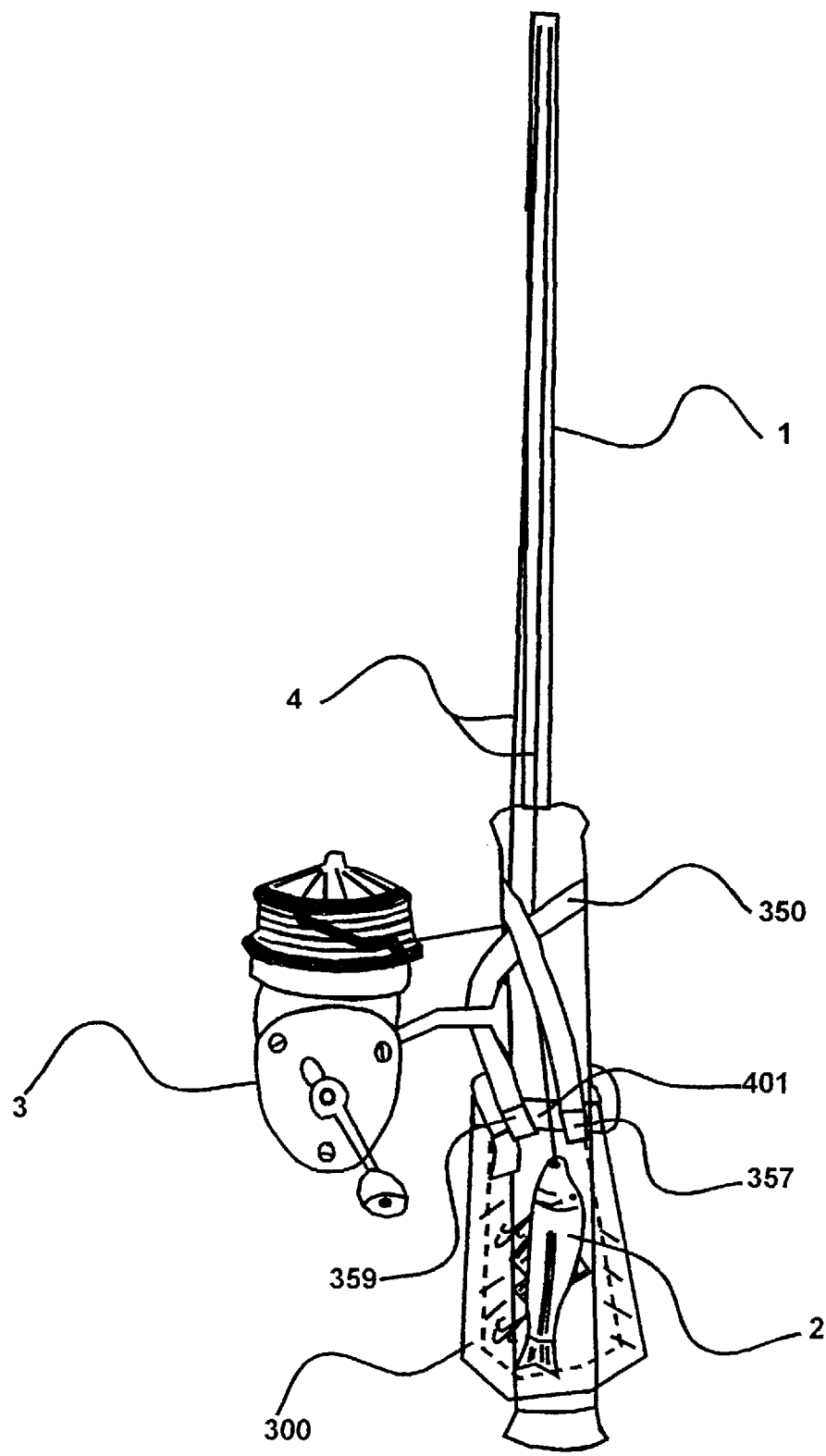
FIG. 13 is a perspective view of the container 300 shown in FIGS. 6 and 7, containing a fishing lure, hooks and line, and the wrap strap 350 shown in FIGS. 11 and 12, attached to the container 300 and retaining the fishing lines against the rod.

FIG. 13 depicts a perspective view of the container 300, containing a fishing lure 2 having hooks and lines 4 secured to the fishing rod 1 and also having a wrap-strap 350 attached to the container 300 and wrapped around the lines 4 and the rod 1, thus securing the lines 4 to the rod 1. In use, a lure 2 (with hooks), which is attached to the fishing rod 1 via a fishing line, is stored within the container 300. The container 300 can be secured to the rod 1 with one motion by wrapping the hook and loop system 400 around the rod 1 and pressing the fasteners together. The fishing lines 4 above the reel can be retained against the rod using the wrap strap 350, initially attached to the container 300 by hook fastener 359 and loop fastener 401; and then, with one motion, the opposite end hook fastener 357 of the wrap strap 350 can be wrapped around the rod 1, criss-crossed over the lines 4, and then attached to the loop fastener 401 of the container 300. This process can be easily reversed when the lure 2 is ready for fishing. The length of the strap may be varied to wrap around the fishing lines 4 and the rod 1 multiple times if needed.

The container 300 may also be of substantial value in a non-rod-attached context for use in storing different types of "terminal tackle" such as hooks with leaders, with or without sinkers, swivels, etc., often used in salt-water fishing environments, or isolated hooks, lures, fishing accessories, or fishing scent marinades, fresh bait or live bait, which may require a leakproof or near-leakproof environment. In this application, the container 300 can be attached to a strip of hook and loop, adhesive-backed fastener mounted to a boat, tackle box, tackle bag, belt, other clothing appendage or other object, so that the contained items may be easily seen and readily accessible and available in an untangled state for immediate use. In this non-rod-attached version, the size and shape and some or all of the protuberances and/or fasteners of the container 300 may be changed and/or eliminated from those of the rod-attached version, depending on storage and/or attachment requirements or objectives.

Another alternative embodiment of the container is shown in FIGS. 14–17. These illustrations feature a container 499 having an elongated fish-like body 500, a head 501, wide mouth 503, belly cavity 502 for housing target objects and tail 505, without middle attachments and with other structural and functional features. On container 499, the upper rod attachment structure is located at the head 501 of the container and is designed as an intrinsic component of the upper container, having a functionality (i) to close the mouth 503 of the container 499, thus restricting the target objects from moving into and through the mouth area of the container when the lines are tightened 526b (FIG. 30) and keeping the target objects in a protected environment within the cavity 502 of the container 499; and (ii) to attach the upper portion of the container 499 to the rod. On container 499, the lower rod attachment structure includes an extrinsic component or protuberance of the lower container, having a functionality to attach the lower portion of the container to the rod. A strap 504 transversely attached to the tail 505 of the container 499 serves as the lower rod attachment structure and allows the tail 505 of the container to be securely attached to the rod. The upper rod attachment structure and the lower rod attachment structure also have the functionality of cinching or retaining the lines against the rod to prevent tangles with other rods, reels and nearby objects, as illustrated by 526a, 526b, FIG. 30. The upper rod attachment structure, although an intrinsic part of the container on this embodiment 499, may alternatively be constructed and attached as an extrinsic protuberance; conversely, the lower rod attachment structure, although extrinsic to the container on this embodiment 499, may be constructed as an intrinsic component. On this embodiment 499, there is no protuberance other than as described, but there may be other protuberances added as deemed appropriate. All protuberances described herein may be reversed, altered, supplemented or eliminated in order to meet functional and design objectives.

As shown in FIGS. 14–17, the container 499 includes a dorsal portion 506 and a ventral portion 507. This embodiment of the invention, created to capture and contain target objects, is similar in design and function to a fish, having a mouth and a partially tubular or cigar-shaped body. The container 499 may consist of multiple forms, shapes and sizes to accommodate many varieties of target objects.

Figure 16:
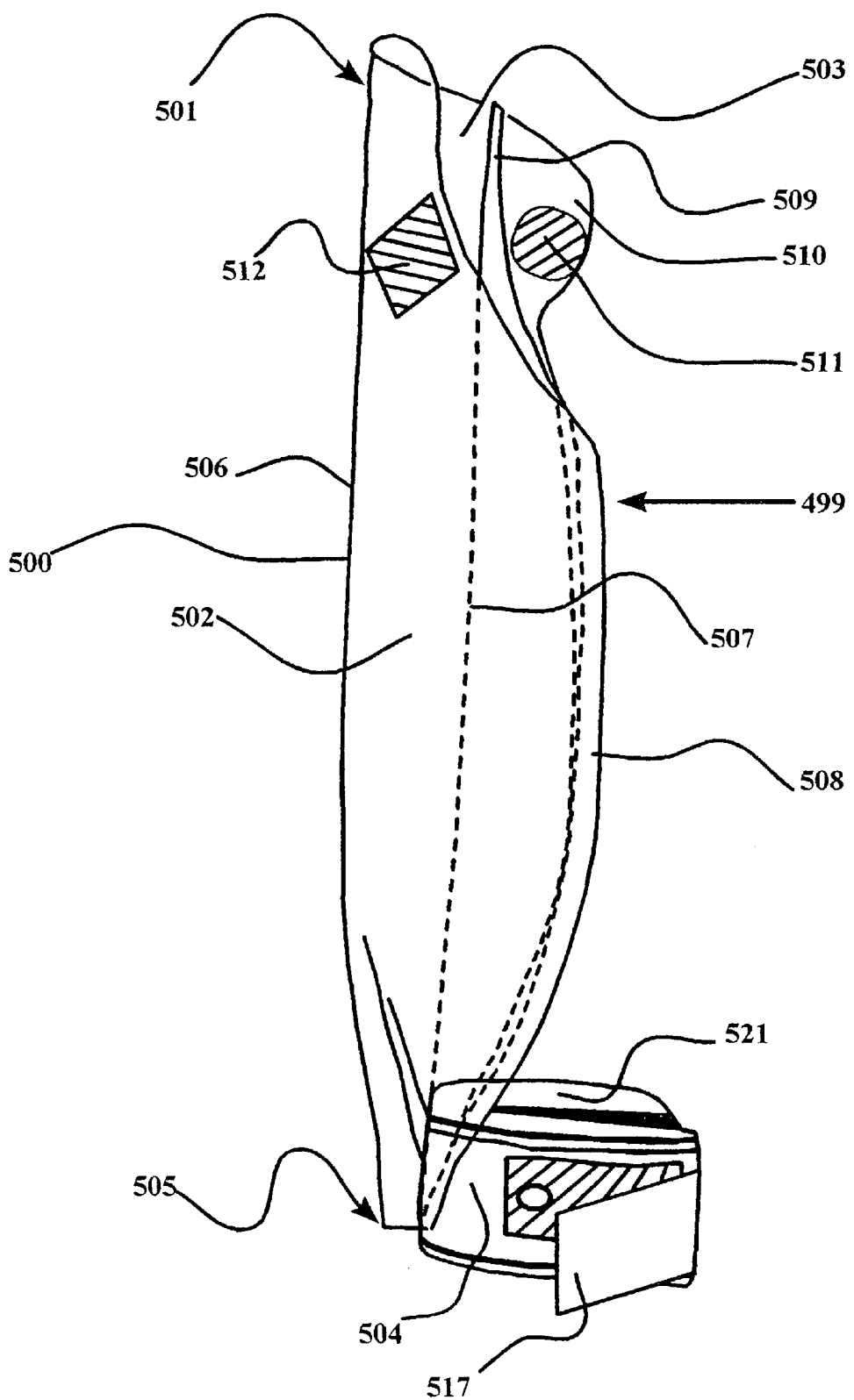
FIG. 16 is a lateral plan view of the right side of the embodiment shown in FIG. 14.
Figure 17:
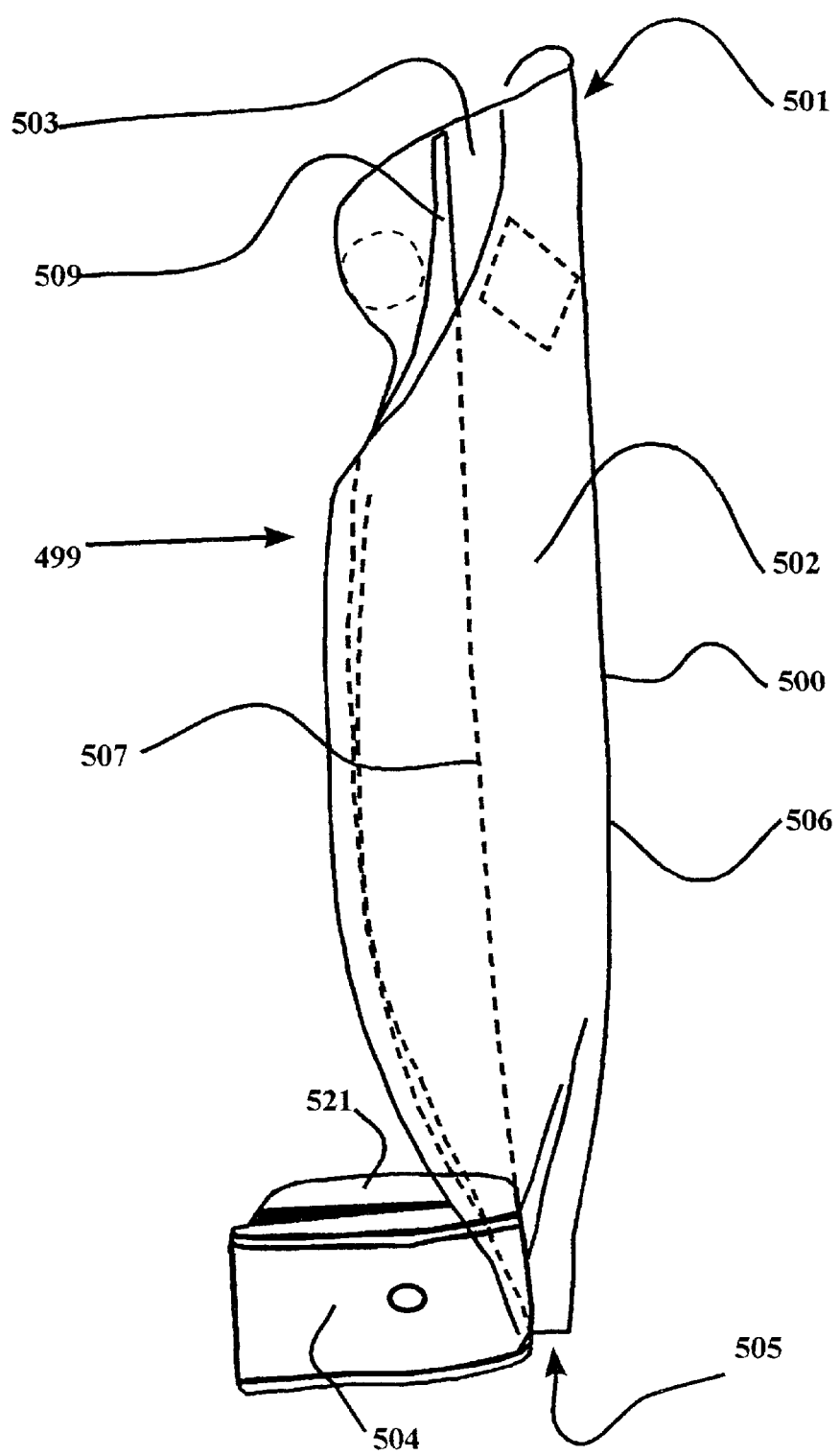
FIG. 17 is a lateral plan view of the left side of the embodiment shown in FIG. 14.
Figure 19:
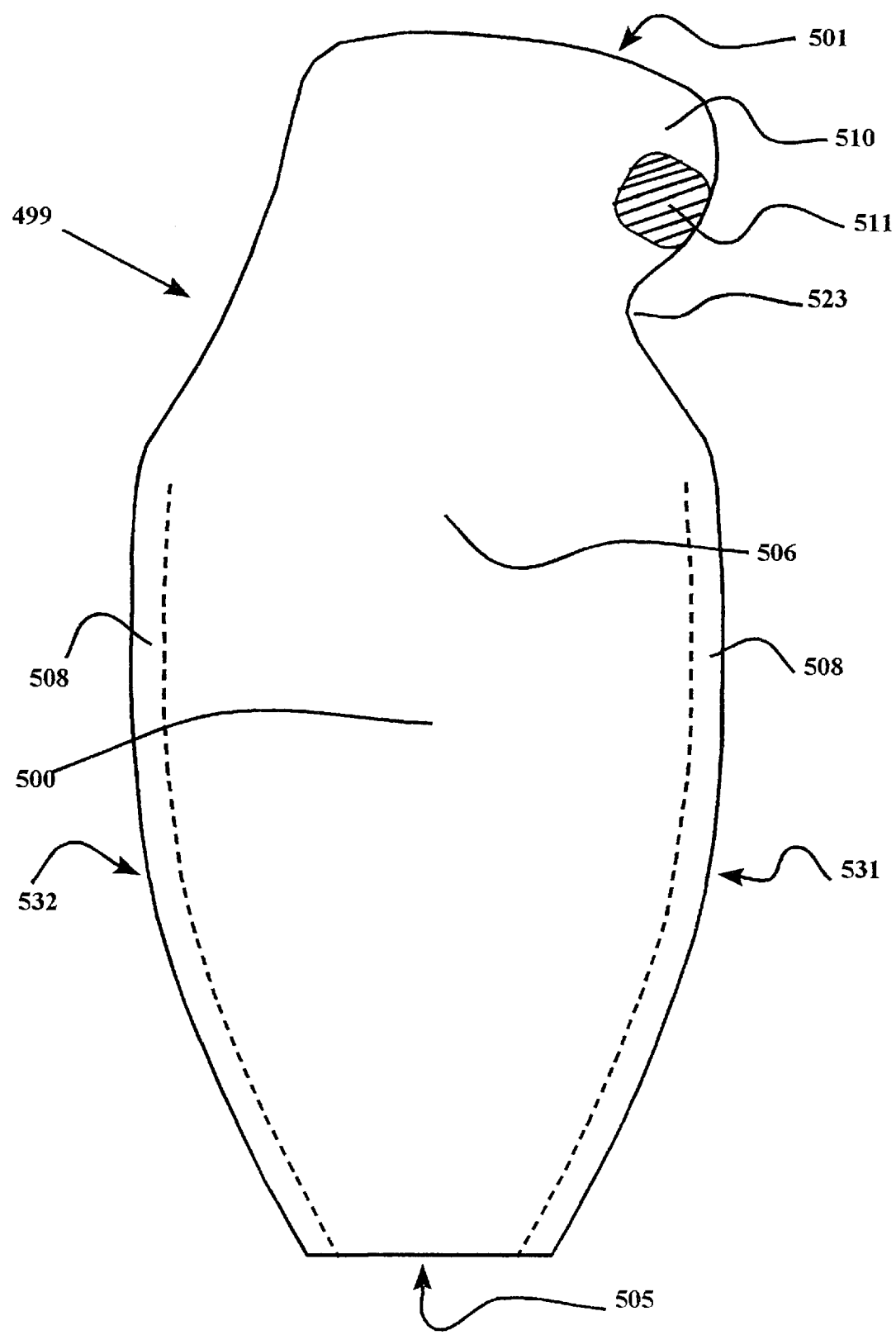
FIG. 19 is a plan view of the inside surface of the unassembled dorsal portion of the embodiment shown in FIG. 15.
Figure 20:
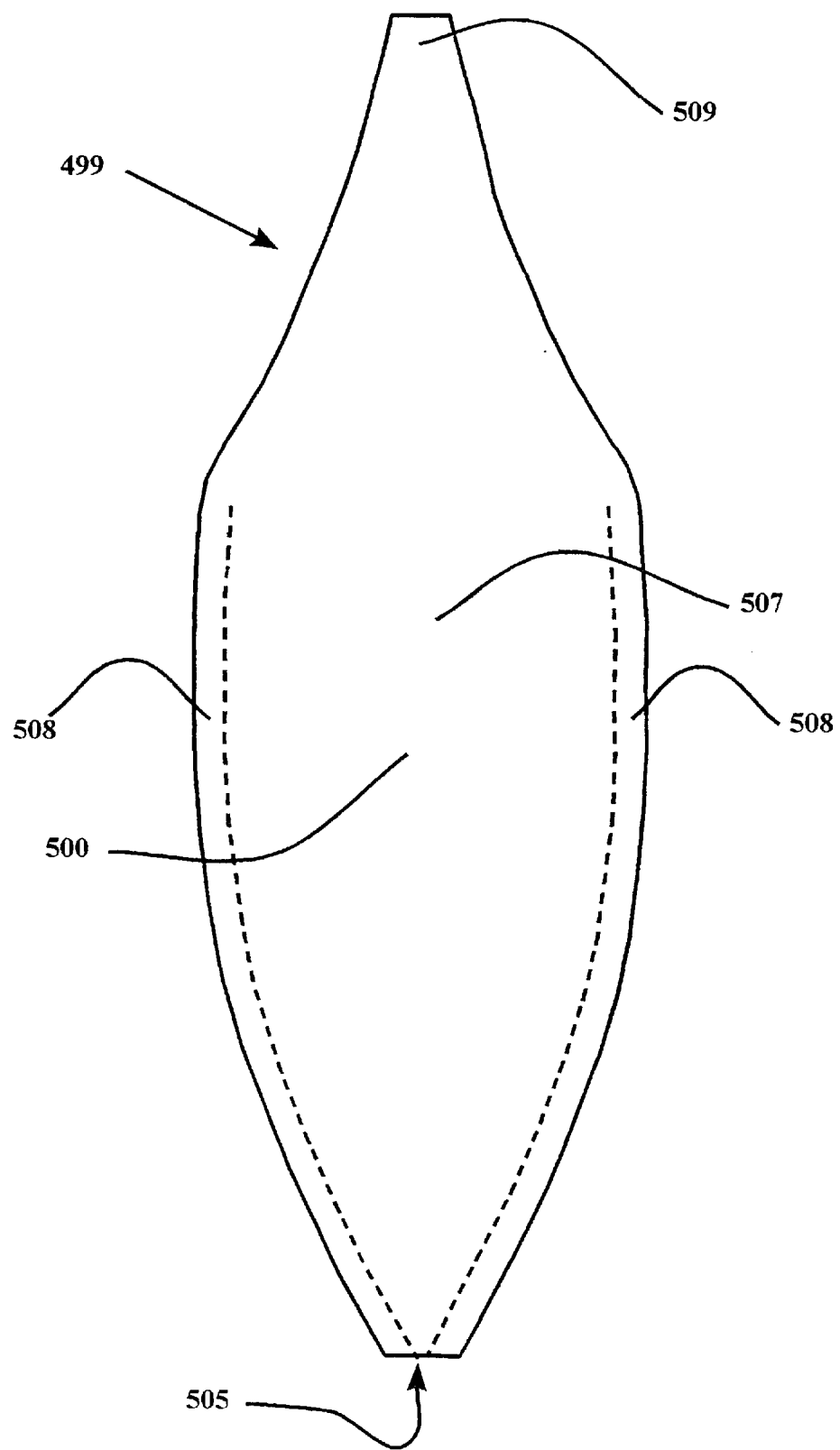
FIG. 20 is a plan view of the unassembled ventral portion of the embodiment shown in FIG. 15.
Figure 30:
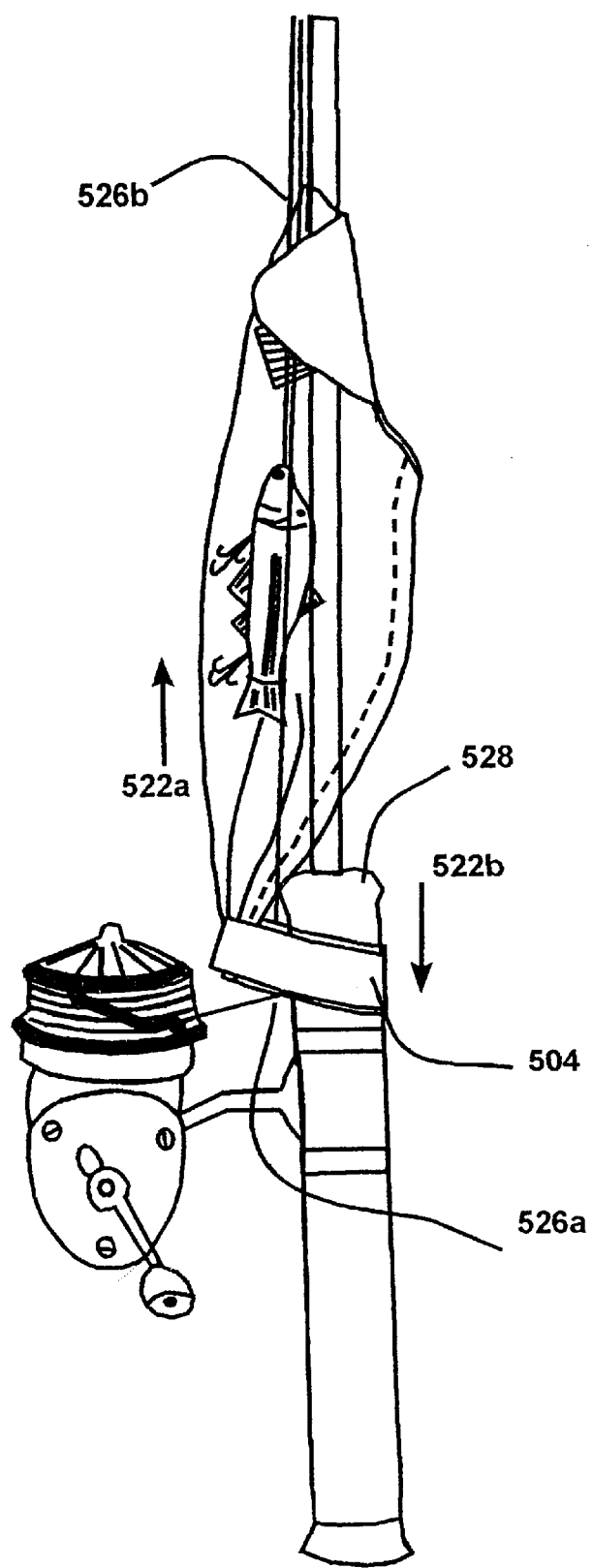
FIG. 30 is a plan view of the container shown in FIG. 16 containing a fishing lure, hooks and line attached to the rod.

The areas 508 (FIGS. 18, 19, 20) on this embodiment, approximately ¼" wide along the lateral edges of the dorsal and ventral portions, depict the regions of the union of the dorsal and ventral portions accomplished by sewing, welding or other means. As illustrated in FIGS. 16 and 17, the upper part of the dorsal and ventral portions 506, 507 are left separated on this embodiment at the head 501 and along the upper lateral sides of the body 500 in order to form a mouth 503 for easy capture and release of the target objects. The upper part of the ventral portion 507 on this embodiment may be cut or molded in a tongue-like configuration 509 (FIG. 20) with a functionality (i) to allow minimal overlap or bunching of the material when the mouth is closed; (ii) to provide a structure to digitally grasp for opening the mouth; and (iii) to ensure tighter retaining of the lines to the rod by the container and restriction of target objects from moving into and through the mouth of the container when the lines are tightened 526b (FIG. 30). The left side (or either side) of the dorsal portion at the head 501 of the container 499 may have a convex protuberance 510 (FIGS. 18 & 19) which is designed to wrap around the tongue 509 of the ventral portion 507 and the rod and lines, and serves as a tab for easy grasping when affixing and removing the container 499 to and from the rod. On the depicted container 499, the angle 523 formed between the protuberance 510 and the upper left margin 531 of the dorsal portion 506 is rounded and obtuse (approximately 100 degrees) to reduce the risk that exiting target objects will snag on the container. A variety of shapes and configurations other than the convex protuberance of the upper rod attachment device may be utilized, as shown in FIGS. 26a–g. The protuberance may just as easily be located on the right side of the dorsal portion 506 on this embodiment to accommodate opposite-handed fisher persons.

Figure 24:
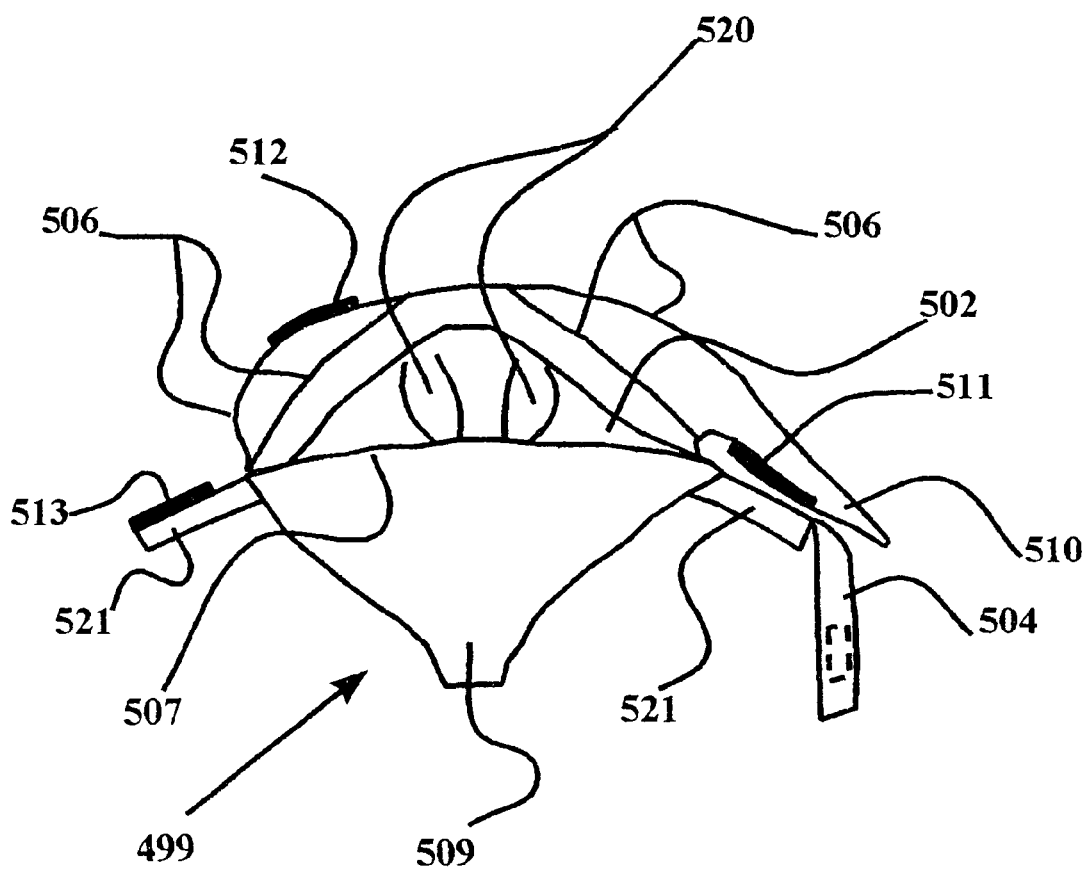
FIG. 24 is a perspective open-mouth view of the embodiment shown in FIG. 14.

As shown in FIG. 24, the dorsal portion 506 on this embodiment may be posteriorly arched such that a sufficient cavity 502 is created to hold easily the target objects. The ventral portion 507 on this embodiment may also have a slight posteriorly arched configuration so that, when attached to the rod, the container 499 embraces or partially conforms to the rod while maintaining its cavity 502.

The dorsal and ventral portions 506, 507 of the container 499 may be comprised of different types of material. The dorsal portion 506 protects and safeguards the target objects from contiguous items and thus may be comprised of a more impregnable material. The ventral portion 507 embraces the rod and retains the exposed lines to the rod in a manner that does not scratch or otherwise damage the rod. The ventral portion 507 therefore may be comprised of a more malleable or pliable material. It is conceivable that more than two portions may be utilized to form a container with multiple sides of varying shapes. See FIGS. 25a–h.

Various degrees of automation techniques can be used to form the container 499. Examples of two types of automated line processes for manufacturing the container 499 feature a "separate-sheet" method and a "tubular" method.

Figure 31:
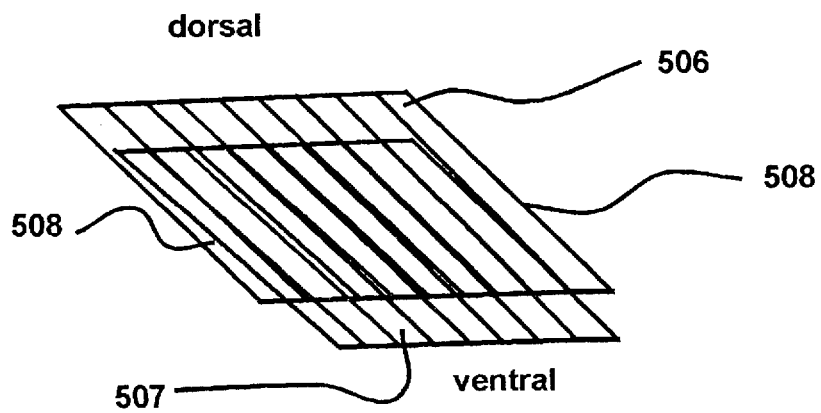
FIG. 31 illustrates the dorsal and ventral portions in the separate sheet method.
Figure 32:
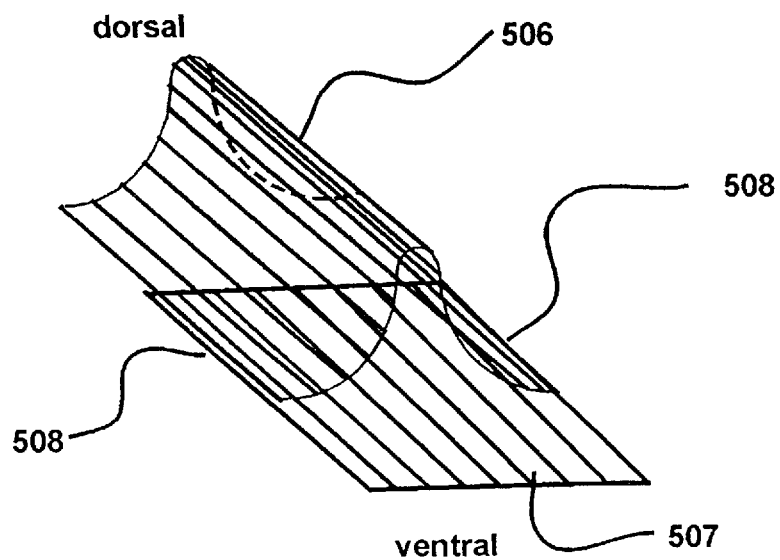
FIG. 32 illustrates the narrowing of the dorsal portion and alignment of the margins of the dorsal and ventral portions during the separate sheet method.
Figure 33:
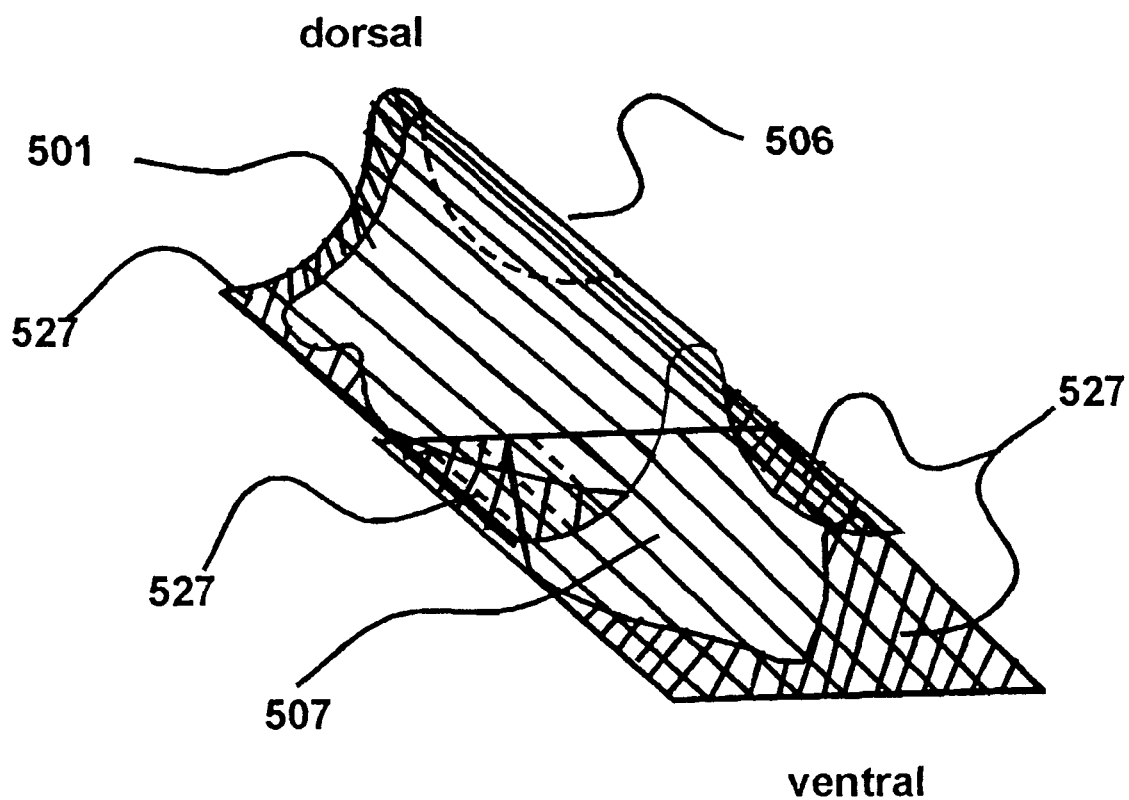
FIG. 33 illustrates removal of the excess material during the separate sheet method.

Assembly in the separate sheet method may utilize a line process (see FIG. 31) where sheets of vinyl or other material, the dorsal portion 506 being wider than the ventral portion 507, can be brought together and processed by narrowing the dorsal portion 506 (see FIG. 32) until it is similar in width to the ventral portion 507 and then uniting the lateral margins 508 of the portions 506, 507 together by sewing, welding, or other means. The excess material 527 resulting from this union can be removed, as shown in FIG. 33. The head 501 of the container 499 which may have different dorsal and ventral shapes can be cut during, before or after the portions 506, 507 are united.

Figure 27:
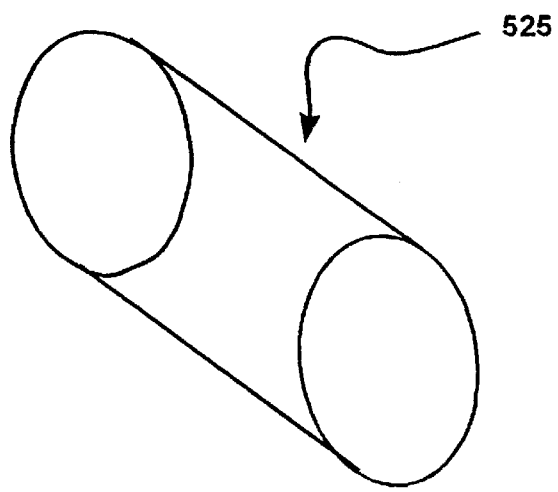
FIG. 27 illustrates the tube used in the tubular method.
Figure 28:
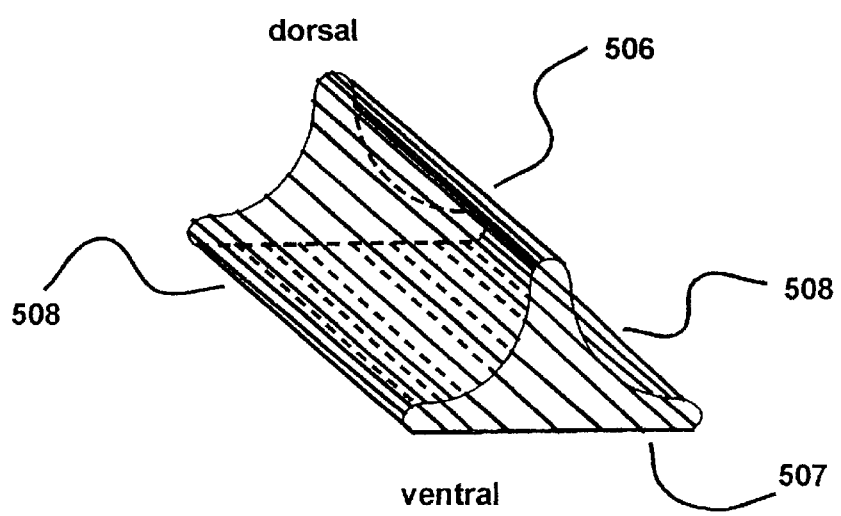
FIG. 28 illustrates the squeezing of the dorsal portion and flattening of the ventral portion during the tubular method.
Figure 29:
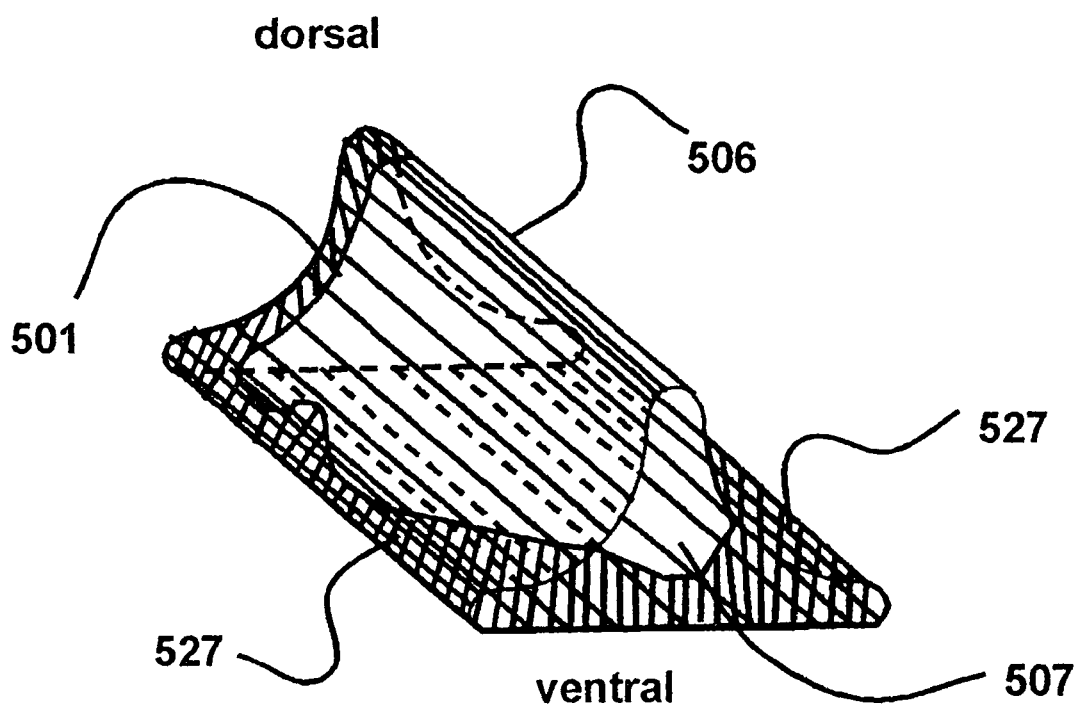
FIG. 29 illustrates removal of the excess material during the tubular method.

Assembly in the tubular method may utilize a line process where a tube of vinyl or other material 525 (see FIG. 27) can be processed by squeezing the dorsal portion 506 of the tube (see FIG. 28), flattening the ventral portion 507 of the tube, pressing and uniting the lateral margins 531, 532 of the tube together by sewing, welding or other means, and removing the excess material 527 (see FIG. 29). The head 501 of the container 499, which may have different dorsal and ventral shapes can be cut during, before or after the sides are united.

Each of these two methods for creating a container having a cavity and appropriate rod conforming qualities may be based on the dorsal portion 506 being effectively "wider" than the ventral portion 507. In the separate sheet method, the wider dorsal portion 506 may be curved or otherwise bent or fashioned to fit the ventral portion 507 at the time of union with the ventral portion 507. In the tubular method, a wider dorsal portion 506 may be created by pinching, squeezing or otherwise fashioning the dorsal portion of the tube to be joined or united with the ventral portion 507. Cutting may occur as desired in either method to trim the edges of the dorsal portion 506 and the ventral portion 507 relative to where they are joined or united, and also, if desired, to lend shape to the container.

In both assembly methods described above, when the margins are united, the necessary cavity is formed as well as a concave belly, which better embraces the line and rod. Additional sides can be added in both the tubular and separate sheet methods, however eventually one will approach a cylindrical shaped container with loss of the desirable concave belly configuration.

Figure 25A:
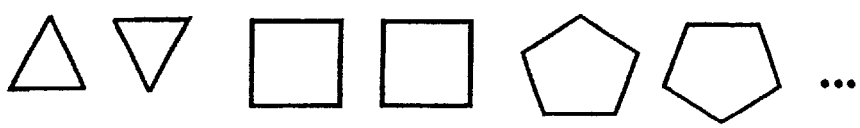
FIG. 25 (a–h) schematically shows a cross section of shapes that containers could assume.
FIG. 25i is a matrix showing options for container shapes.
FIG. 25j shows four examples of the application of FIG. 25i.
Figure 25B:
Figure 25C:
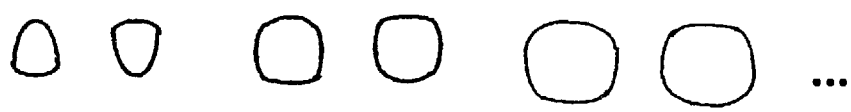
Figure 25D:
Figure 25E:
Figure 25F:
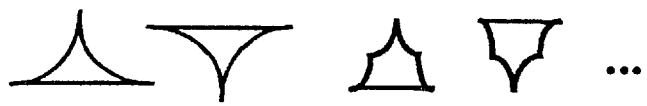
Figure 25G:
Figure 25H:
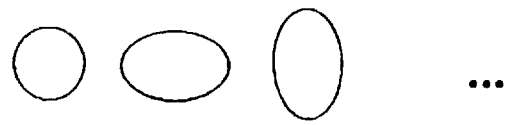
Figure 25J:
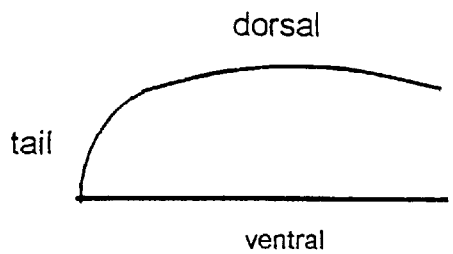
Figure 25J:
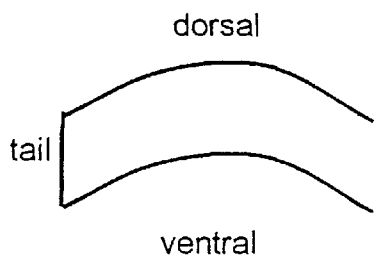
Figure 25J:
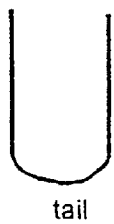
Figure 25J:
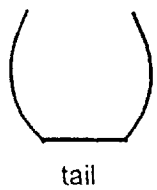
Figure 26A:
FIG. 26a–g schematically shows a cross section of shapes that components of containers could assume.
Figure 26B:
Figure 26C:
Figure 26D:
Figure 26E:
Figure 26F:
Figure 26G:

The panels of the container 499 can be accomplished by (i) blow-molding techniques in which vinyl or other material, while in a malleable state, is expanded inside a mold by a gas or fluid, with subsequent permanent retention of the desired shape when the mold is removed, a method similar to inflating a tube within a tire; (ii) injection-molding techniques, in which vinyl or other material is placed on or around a mold while in a malleable state with subsequent permanent retention of the desired shape when the mold is removed, a method similar to waffle making; and (iii) any number of other manufacturing and assembly alternative techniques known to individuals skilled in the art. The use of injection molding techniques allows for extensive possibilities of open-path cross-sectional sizes and shapes of container parts having two or more sides, some of which are shown in FIGS. 26a–g. The use of blow molding techniques also allows for extensive possibilities of closed-path cross-sectional container sizes and shapes, some of which are shown in FIGS. 25a–h. FIGS. 25i–j show various combinations of straight, concave, and convex sides, in dorsal, ventral and lateral plan views, that can be utilized to meet container design objectives.

Figure 14:
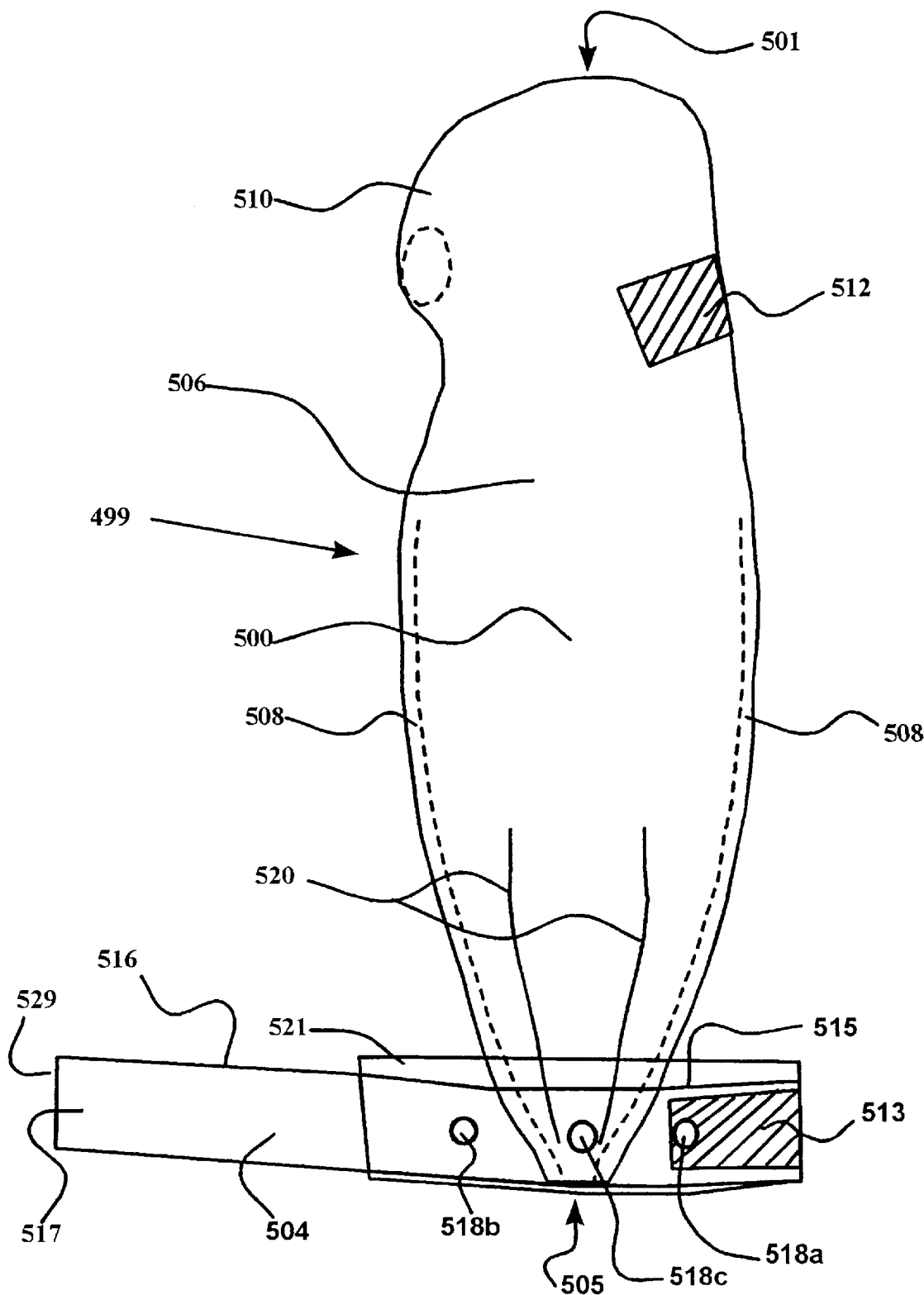
FIG. 14 is a dorsal plan view of another embodiment of an assembled container 499.
Figure 18:
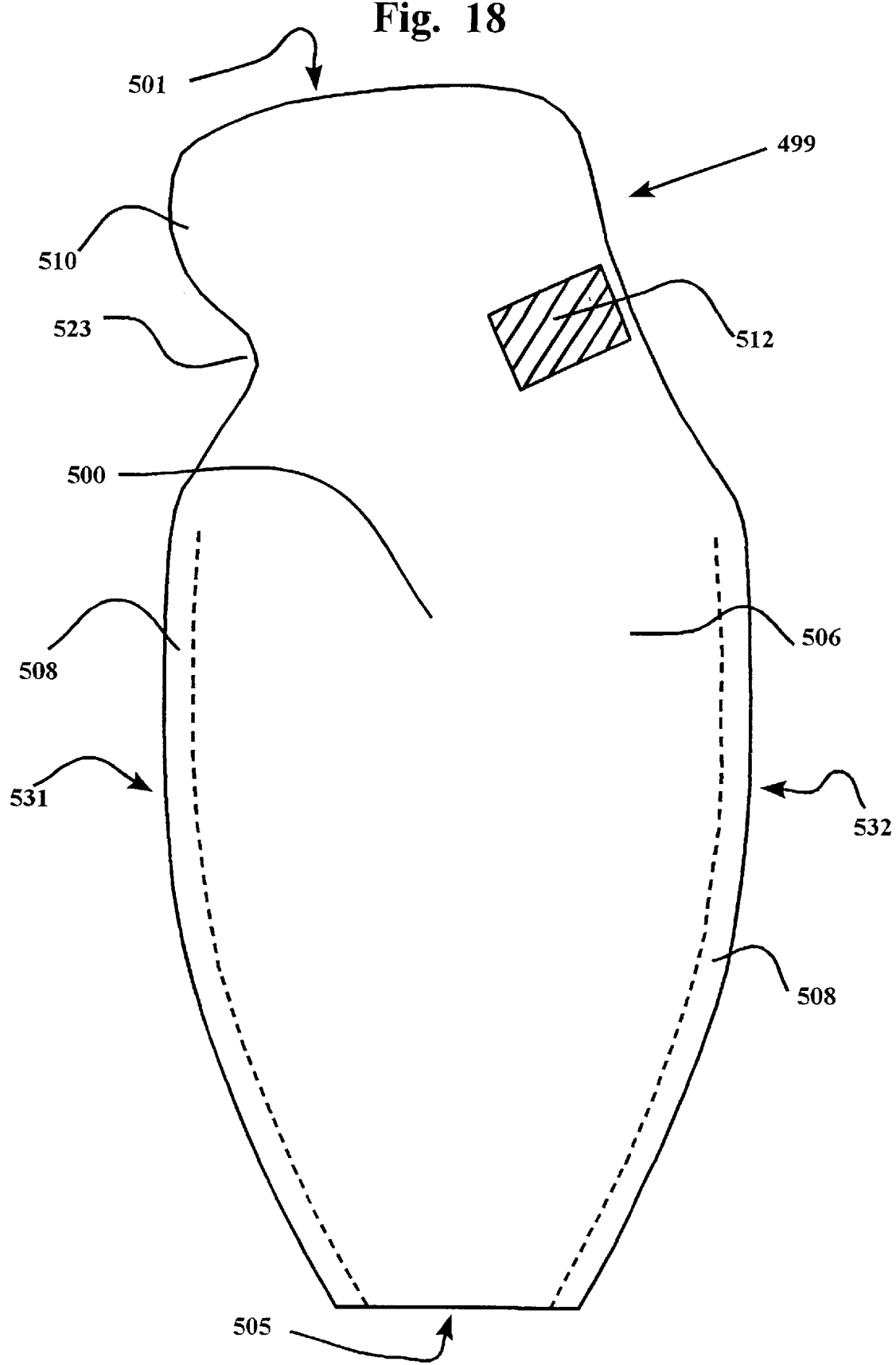
FIG. 18 is a plan view of the outside surface of the unassembled dorsal portion of the embodiment shown in FIG. 14.

Fasteners, for example hook and loop fasteners, may be used to ensure the container 499 remains closed and firmly attached to the rod or other surface. On this embodiment 499, hook fastener 511 (FIGS. 15, 19) is attached to the inside surface of the left protuberance 510 of the dorsal portion 506 and a corresponding loop fastener 512 is attached to the upper right outside portion of the dorsal portion 506 (FIGS. 14, 18). When the protuberance 110 is wrapped around the tongue 509, rod and lines, the hook 511 and loop 512 fasten together. As a result, the mouth 503 of the container 499 is closed, thus securing the contents of the container 499. The head 501 of the container 499 is likewise attached to the rod. The narrowness of the tongue 509 of the ventral portion 507 ensures a tight fit between the container 499 and the rod.

The fasteners can be of varied sizes, shapes and materials. The hook fastener 511 and loop fastener 512 may be a circle, round box, rectangle, or other shape. On the depicted embodiment 499, the hook fastener 511 is in the shape of a round box with an approximate ¾" diameter, and the loop fastener 512 is a rectangle which measures approximately 1⅛"×¾".

The location of the fasteners is important to accomplish easy and symmetrical closure of the mouth 503 with minimal snagging of incoming or outgoing target objects. Because the hook fastener 511 has less tendency to snag target objects than the loop fastener 512, it may be placed on the inside surface of protuberance 510 where it is in closer proximity to entering and exiting target objects. The loop fastener 512, correspondingly, may be placed on the outer surface of the dorsal portion 506. The location of these fasteners 511, 512, however, can be reversed so that the hook fastener 511 is on the outside of the dorsal portion 506 and the loop fastener 512 is on the inside surface of the protuberance 510.

Hook and loop fasteners may be superior to other types of fasteners because they adjust for tightening of the head 501 of the container 499 around rods of varying diameters in addition to facilitating rapid, one-handed closing and opening of the mouth of the container 499. Snaps or other types of fasteners, however, may also be utilized. To maintain the mouth 503 in an open position when the fasteners are separated, the thickness of the material may be varied, or a stiffening-type or spring-like material may be added to the head 501 of the container 499.

The tail 505 of the container 499 can be closed or may remain open. If the manufacturing process utilized to produce the container 499 requires closure of the tail 505, that closure may be accomplished prior to, during or subsequent to attachment of the container 499 to the lower rod attachment structure described below. When the dorsal portion 506 is wider than the ventral portion 507 or vice versa, a natural bunching of material at the tail occurs when the tail is closed, resulting in pleats 520 (FIG. 14). The tail 505 may taper almost to a point to increase the depth and capacity of the cavity 502 and to better accommodate the shape of target objects. In a molded construction of the container 499, pleats 520 may be eliminated, the tail 505 may not need to be tapered to a point in order to achieve volume objectives, and the molded unit can have a variety of shapes. See FIGS. 25 & 26.

The tail 505 of the container 499 may be equipped with a lower rod attachment structure, which serves to attach the container tightly to the rod foregrip and minimize the likelihood of the container 499 slipping relative to the rod, while at the same time capturing and retaining the line immediately above the reel so that it does not entangle with surrounding objects. The method of affixing the strap to the tail of the container can be important for optimal function, as described below. By having a point union from a rivet 518c, dielectric welding or other bond, regardless of the shape of the tail end of the container, it has been found that longitudinal tension on the container (arrow 522a), FIG. 30, which results from tightening the line to the target object, tilts and wedges the strap and foam pad 521 sideways (arrow 522b) against the rod foregrip 528. It thereby increases the pad's adherence to the foregrip and minimizes the likelihood of the container sliding up or down the rod. The lower rod attachment structure need not be a separate protuberance, and might be constructed as an intrinsic component of the container.

Figure 15:
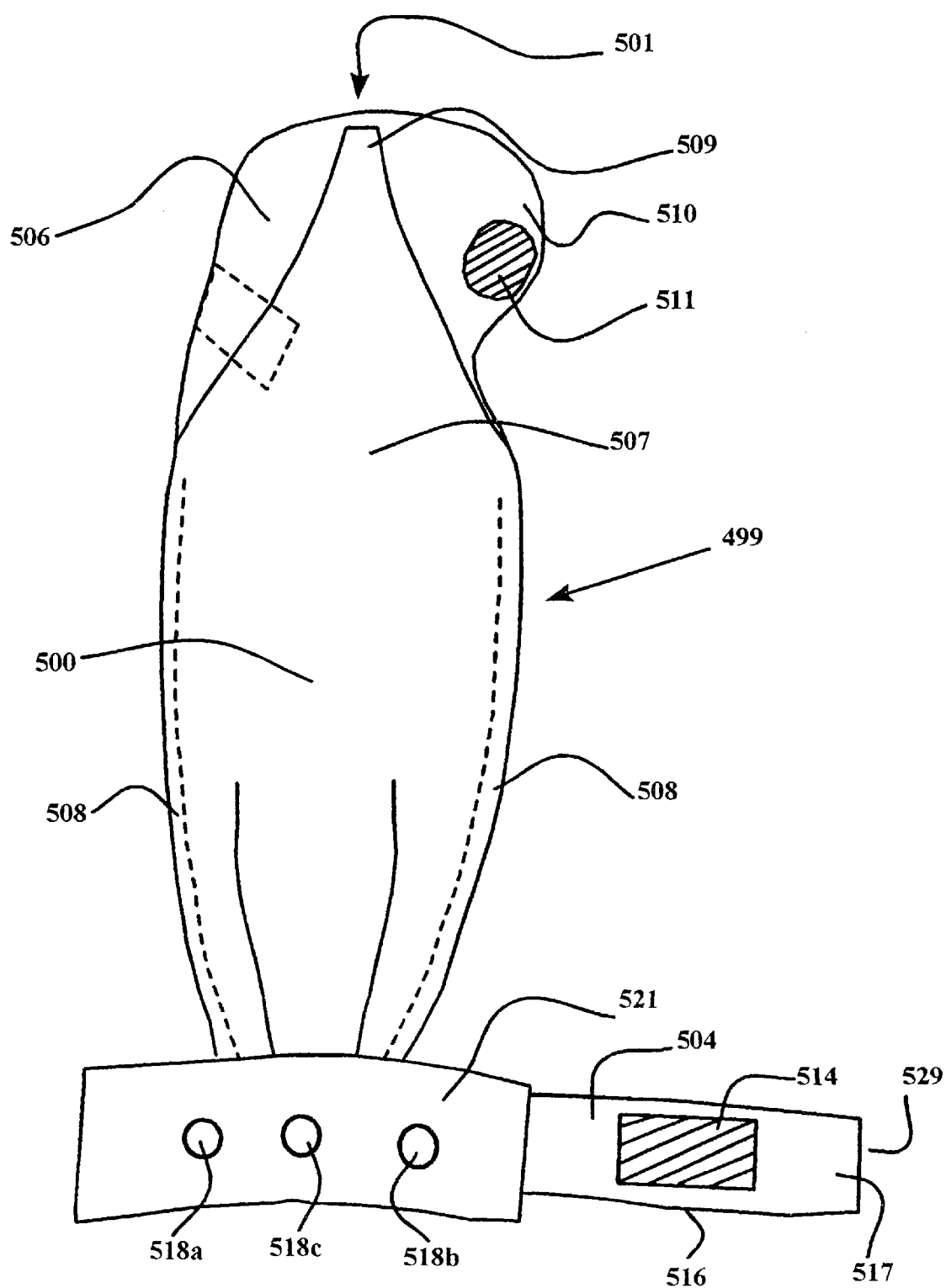
FIG. 15 is a ventral plan view of the embodiment shown in FIG. 14.

The attachment function may be accomplished by a number of methods, depending on the desired configuration and design objectives for securing the container to the rod. One method can use a strap, cord, rope, band, chain or similar device connected to the container to encircle the rod one or more times. Another method can use an extrinsic, compressive-type device, such as a clip, clothes pin, or similar mechanism, to attach the container to the rod. On the present embodiment 499, as shown in FIGS. 14 and 15, a transverse strap 504 may be used to secure the tail 505 of the container 499 to the rod. The transverse strap 504 may be attached to the tail 505 of the container 499 with rivet 518c. The strap 504 on the present embodiment may have a short extension 515 and a long extension 516, although both extensions 515, 516 could be the same length or reversed. A strip of hook fastener 513 may be attached to the dorsal surface of the short extension 515, and a strip of loop fastener 514 may be attached to the ventral surface of the long extension 516, allowing the strap 504 to be easily and tightly wrapped around the rod at the foregrip, thus minimizing the likelihood of the container 499 sliding relative to the rod. The loop fastener 514 on this embodiment may be offset from the end 529 of the strap 504, thus creating a tab 517 for easy attachment and detachment. The hook 513 and loop 514 fastener material on this embodiment may be reversed in position on the strap 504 and also may be changed in location on the strap 504 to accommodate different sizes and shapes of rod foregrip areas. The strap 504 may also be reversed, placing the tab 517 on the opposite side of the container 499 to better accommodate opposite-handed fisher persons. The size and shape of the tab 517 may change from straight right-angle margins to rounded, oblique, curved, or other configurations (see FIG. 26) for esthetic and/or functional purposes, or conceivably the tab 517 may be eliminated. Since the strap material may develop new memory from its position around the rod, the thickness of the strap material may be varied or a stiffening-type or spring-like material may be added to maintain it in an extended position after the fasteners are separated.

The addition of a pad of buoyant material, such as a foam pad 521 (FIGS. 14, 15), to the tail 505 of the container 499, while not mandatory, may have important advantages. In addition to ensuring the container 499 floats if inadvertently dropped in the water, the pad 521 may facilitate better grasping of the rod foregrip. The foam pad 521 on this embodiment may be attached to the strap 504 with rivets 518a and 518b or with adhesive or other means. Buoyant material, such as foam, like the strap material, may develop new memory from its position around the rod, and thus the thickness of the buoyant material may be varied or a stiffening-type or spring-like material may be added to maintain it in an extended position when not attached to rod.

Figure 21:
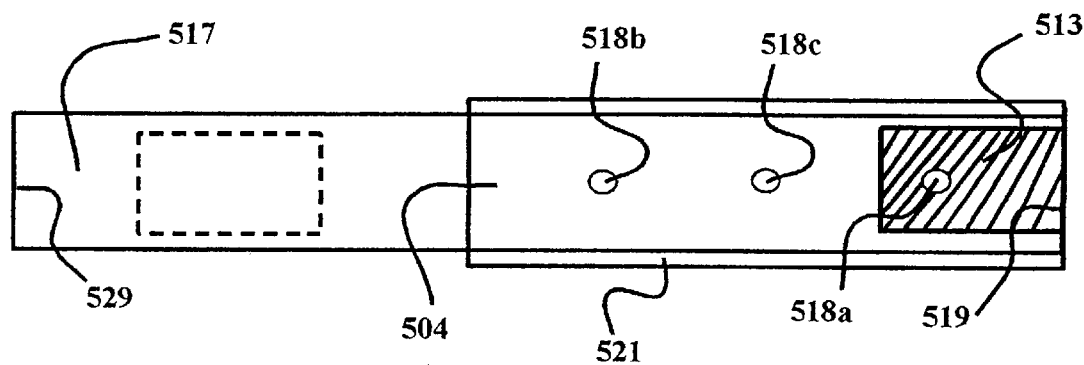
FIG. 21 is a dorsal plan view of the assembled strap of the embodiment shown in FIG. 14.
Figure 22:
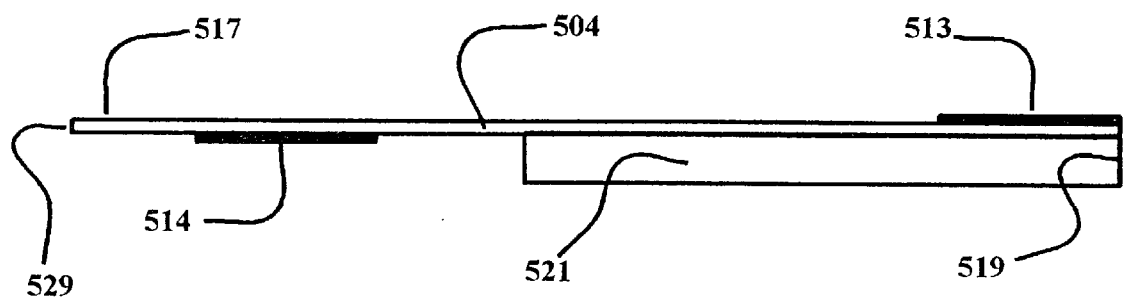
FIG. 22 is a lateral plan view of the side of the assembled strap of the embodiment shown in FIG. 14.
Figure 23:
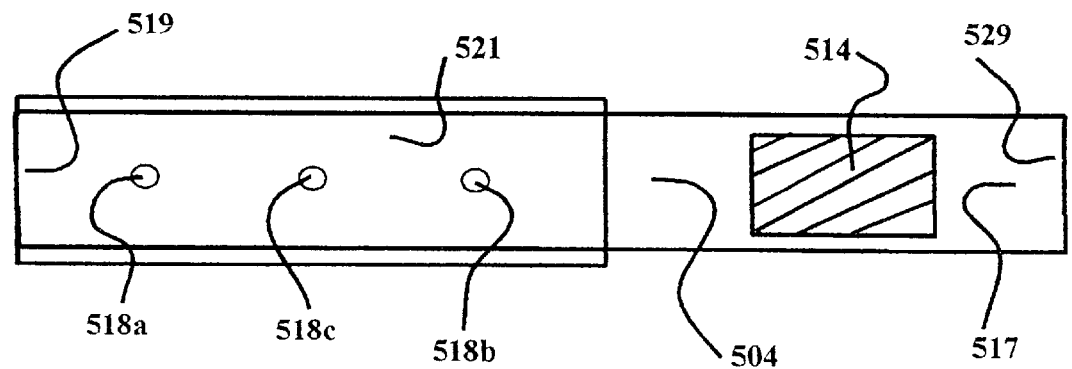
FIG. 23 is a ventral plan view of the assembled strap of the embodiment shown in FIG. 15.

FIGS. 21, 22, and 23 show the dorsal, transverse, and ventral views, respectively, of the assembled strap and its components. On the depicted embodiment 499, the dimension of the flexible strap 504 is 1"×8", and the hook fastener 513 on the dorsal surface is ¾"×1⅜" and lies flush with the right end 519 of the strap 504. On the depicted embodiment, the loop fastener 514 on the ventral surface is ¾"×1⅜" and 1" from the left end 520 of the strap 504, thereby creating a tab 517 for ease of grasping. On the depicted embodiment, the foam pad 521 is approximately 4" long×1¼" wide and approximately ⅜" thick, with its right end lying flush with the right strap margin 519. The size of the pad 521 on this embodiment is dependent on its ability to float the container should it fall in the water. Rivet 518a used on the depicted embodiment extends through the hook fastener 513, strap 504, and foam pad 521 and lies 1⅛" from the end 519 of the strap 504. Rivet 518b goes through the strap 504 and foam pad 521 and lies 3½" from the end 519 of the strap 504. Rivet 518c goes through tail 505 of the container 499, strap 504, and foam pad 521. On the depicted embodiment 499, the dorsal portion 506, the ventral portion 507, and the flexible strap 504 are comprised of 19 gauge clear flexible vinyl, although many different colors, types and thickness of materials may be utilized.

Figure 34A:
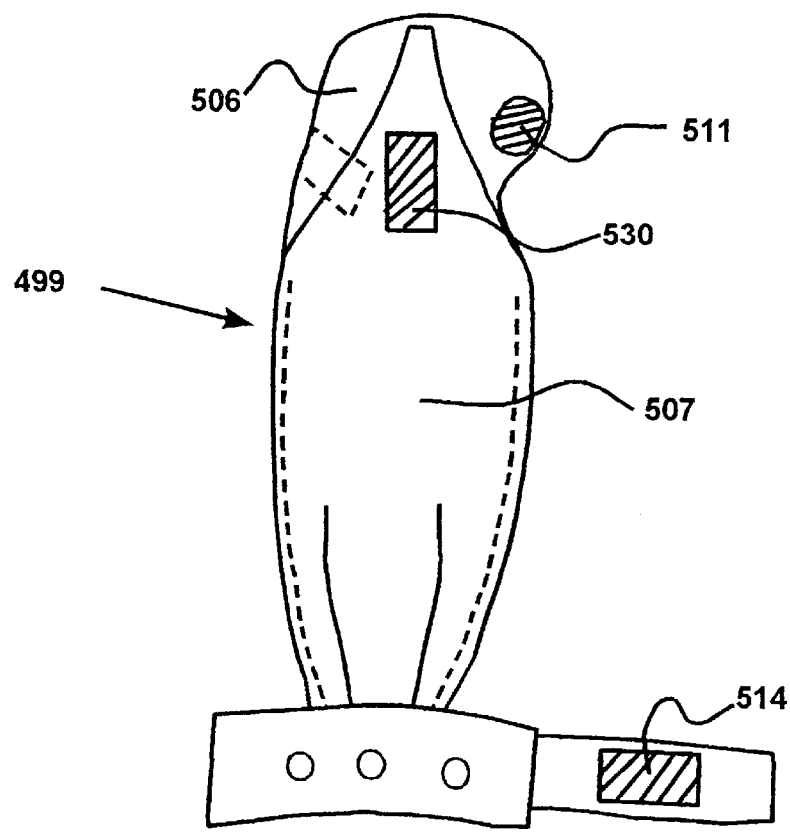
FIGS. 34a and b are plan views of a hook fastener located on the ventral portion of the embodiment shown in FIG. 15.
Figure 34B:
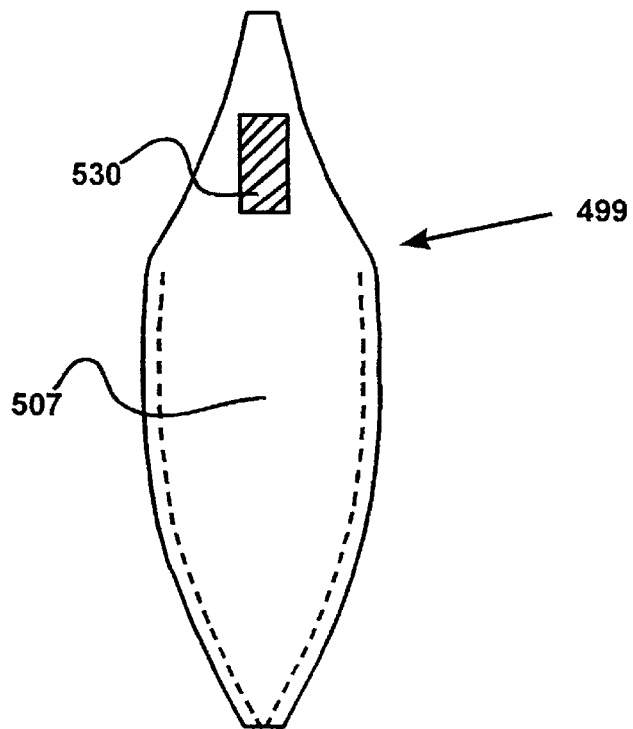

For efficiency in fishing, the container must be available and at arms reach at any time, and therefore it is necessary to be able to quickly and easily attach and detach it to the user's clothing or other desirable nearby objects. Hook and loop fasteners on the container can provide these desirable features. On the depicted embodiment 499, the hook fastener 511 on the inside of the dorsal portion 506 or the loop fastener 512 on the outside of the dorsal portion 506 can be attached to a corresponding loop or hook fastener on a belt or other desirable object. Also, the hook 513 and loop 514 fasteners on the strap of the preferred embodiment may be attached to a corresponding loop or hook fastener on a belt or other desirable object. Furthermore, additional hook and loop material may be added to various locations on the container 499 for attachment to a corresponding loop or hook fastener on a belt or other desirable object. FIG. 34 shows a strip of hook or loop fastener material 530 placed on the ventral surface of the upper ventral portion 507 of the container 499 for the purpose of attaching the container 499 to a corresponding loop or hook fastener on a belt or other desirable object.

An example of directions for using the container 499 may be as follows:
1. Hold the container in the left hand like a glass, with the thumb keeping the tongue down and open.
2. With the rod in the right hand and the line and rod guides facing the belly of the container, drop the target object in the container.
3. Allow the line to flow freely from the reel spool, let the tongue close, and place the rod in the belly of the container. Then press the top fasteners of the container together, retaining the two lines to the rod.
4. Slide the container down the rod until the foam is as close to the reel as possible. The line should lie in the middle of the foam.
5. Wrap the bottom strap tightly around the rod foregrip, retaining the line above the reel to the foregrip. Press the bottom fasteners of the container together, and then turn the reel spool to tighten the line.
6. When it is time to fish, reverse the steps in a quick, one-handed manner.

The foregoing description of embodiments of the invention has been presented only for the purpose of illustration and description and is not intended to be exhaustive or to limit the invention to the precise forms disclosed. Modifications and variations are possible in light of the above disclosure without departing from the scope or spirit of the invention. The sizes, shapes and descriptions set forth above may vary as desired, depending on requirements and needs by rod and target object manufacturers and also as a result of container manufacturing, production and assembly efficiencies and design objectives.

What is claimed is:
1. A container for containing fishing tackle, comprising:
an elongated flexible first panel comprising an upper section and a lower section, said upper section having an upper fastener that includes two portions, said upper fastener portions adapted to fasten to each other to facilitate at least partial encirclement of a fishing rod by said upper section of said first panel in an at least partially conforming relationship, in order to connect said container to the rod;
an elongated flexible second panel comprising an upper section and a lower section;
said first panel and said second panel at least partially joined to each other near the periphery of each said panel to form a flexible, elongated cavity walled on one side by said first panel and on another side by said second panel, said cavity adapted to receive the fishing tackle, at least part of said upper sections of said panels forming a throat communicating with said cavity and the space outside said container, the panels substantially closing said cavity adjacent to the lower sections of said panels thereby precluding escape of the fishing tackle adjacent to said lower sections;
said container adapted to preclude removal of the fishing tackle from said cavity when said upper fastener secures said container to the rod and to allow easy release of the fishing tackle from said cavity when said upper fastener does not secure said container to the rod; and a lower fastener connected to a lower section of at least one of said panels, said lower fastener including two portions adapted to fasten to each other to secure a lower part of said container to the rod.

2. The container for containing fishing tackle according to claim 1 wherein at least one of said fastener portions comprises hook material and loop material.

3. The container for containing fishing tackle according to claim 1 further comprising at least one protuberance formed from the upper section of said first panel, wherein at least one of said fastener portions is positioned on said at least one protuberance.

4. The container for containing fishing tackle according to claim 1 further comprising at least one strap formed from the lower section of said first panel, wherein at least one of said lower fastener portions is connected to said at least one strap.

5. The container for containing fishing tackle according to claim 1 wherein the said panels are at least partially joined by bonding.

6. The container for containing fishing tackle according to claim 1 wherein said panels are at least partially formed of plastic material.

7. The container for containing fishing tackle according to claim 1 wherein said panels are at least partially transparent.

8. The container for containing fishing tackle according to claim 1 wherein said panels are panel portions.

9. The container for containing fishing tackle according to claim 1 wherein said fishing tackle is a lure.

10. An apparatus for fishing, comprising:
    a fishing rod
    a fishing reel;
    fishing tackle; and
    a container for containing fishing tackle, comprising:
        an elongated flexible first panel comprising an upper section and a lower section, said upper section having an upper fastener that includes two portions, said upper fastener portions adapted to fasten to each other to facilitate at least partial encirclement of a fishing rod by said upper section of said first panel in an at least partially conforming relationship, in order to connect said container to the rod;
        an elongated flexible second panel comprising an upper section and a lower section;
        said first panel and said second panel at least partially joined to each other near the periphery of each said panel to form a flexible, elongated cavity walled on one side by said first panel and on another side by said second panel, said cavity adapted to receive the fishing tackle, at least part of said upper sections of said panels forming a throat communicating with said cavity and the space outside said container, the panels substantially closing said cavity adjacent to the lower sections of said panels thereby precluding escape of the fishing tackle adjacent to said lower sections;
        said container adapted to preclude removal of the fishing tackle from said cavity when said upper fastener secures said container to the rod and to allow easy release of the fishing tackle from said cavity when said upper fastener does not secure said container to the rod; and
        a lower fastener connected to a lower section of at least one of said panels, said lower fastener including two portions adapted to fasten to each other to secure a lower part of said container to the rod.

11. The apparatus for fishing according to claim 10 wherein at least one of said fastener portions comprises hook material and loop material.

12. The apparatus for fishing according to claim 10 further comprising at least one protuberance formed from the upper section of said first panel, wherein at least one of said fastener portions is positioned on said at least one protuberance.

13. The apparatus for fishing according to claim 10 further comprising at least one strap formed from the lower section of said first panel, wherein at least one of said lower fastener portions is connected to said at least one strap.

14. The apparatus for fishing according to claim 10 wherein the said panels are at least partially joined by bonding.

15. The apparatus for fishing according to claim 10 wherein said panels are at least partially formed of plastic material.

16. The apparatus for fishing according to claim 10 wherein said panels are at least partially transparent.

17. The apparatus for fishing according to claim 10 wherein said panels are panel portions.

18. The apparatus for fishing according to claim 10 wherein said fishing tackle is a lure.

* * * * *